United States Patent
Annaka

(10) Patent No.: US 11,258,133 B2
(45) Date of Patent: Feb. 22, 2022

(54) BINDER COMPOSITION FOR NON-AQUEOUS SECONDARY BATTERY POROUS MEMBRANE, SLURRY COMPOSITION FOR NON-AQUEOUS SECONDARY BATTERY POROUS MEMBRANE, POROUS MEMBRANE FOR NON-AQUEOUS SECONDARY BATTERY, AND NON-AQUEOUS SECONDARY BATTERY AND PRODUCTION METHOD THEREFOR

(71) Applicant: ZEON CORPORATION, Tokyo (JP)

(72) Inventor: Koji Annaka, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 0 days.

(21) Appl. No.: 16/605,618

(22) PCT Filed: Apr. 19, 2018

(86) PCT No.: PCT/JP2018/016170
§ 371 (c)(1),
(2) Date: Oct. 16, 2019

(87) PCT Pub. No.: WO2018/198940
PCT Pub. Date: Nov. 1, 2018

(65) Prior Publication Data
US 2020/0127263 A1    Apr. 23, 2020

(30) Foreign Application Priority Data

Apr. 26, 2017   (JP) .............................. JP2017-087706

(51) Int. Cl.
| | |
|---|---|
| *H01M 50/411* | (2021.01) |
| *H01M 50/409* | (2021.01) |
| *H01M 50/403* | (2021.01) |
| *H01M 50/40* | (2021.01) |
| *H01M 4/62* | (2006.01) |
| *H01M 10/0566* | (2010.01) |
| *H01M 10/058* | (2010.01) |
| *H01M 50/46* | (2021.01) |
| *H01M 10/0525* | (2010.01) |

(52) U.S. Cl.
CPC ......... *H01M 50/411* (2021.01); *H01M 4/622* (2013.01); *H01M 10/058* (2013.01); *H01M 10/0566* (2013.01); *H01M 50/46* (2021.01); *H01M 10/0525* (2013.01)

(58) Field of Classification Search
None
See application file for complete search history.

(56) References Cited

U.S. PATENT DOCUMENTS

| | | | |
|---|---|---|---|
| 2015/0072213 A1* | 3/2015 | Kaneda | ................ H01M 50/411 |
| | | | 429/144 |
| 2016/0268565 A1 | 9/2016 | Sasaki et al. | |

FOREIGN PATENT DOCUMENTS

| | | |
|---|---|---|
| CN | 104170121 A | 11/2014 |
| JP | 2013145763 A | 7/2013 |
| JP | 2015028843 A | 2/2015 |
| JP | 5682737 B2 | 3/2015 |
| JP | 2015041576 A | 3/2015 |
| JP | 2015/088253 * | 5/2015 .......... H01M 10/052 |
| JP | 2015088253 A | 5/2015 |
| JP | 2016154107 A | 8/2016 |
| WO | 2013141140 A1 | 9/2013 |
| WO | 2013146515 A1 | 10/2013 |
| WO | 2015064411 A1 | 5/2015 |

OTHER PUBLICATIONS

English translation of JP 2015/088253 (Year: 2015).*
May 15, 2018, International Search Report issued in the International Patent Application No. PCT/JP2018/016170.
Oct. 29, 2019, International Preliminary Report on Patentability issued in the International Patent Application No. PCT/JP2018/016170.
Nov. 30, 2020, the Extended European Search Report issued by the European Patent Office in the corresponding European Patent Application No. 18791458.5.

* cited by examiner

*Primary Examiner* — Yoshitoshi Takeuchi
(74) *Attorney, Agent, or Firm* — Kenja IP Law PC

(57) ABSTRACT

Provided is a binder composition for a non-aqueous secondary battery porous membrane capable of forming a porous membrane having improved adhesiveness in electrolyte solution, heat shrinkage resistance in electrolyte solution, and blocking resistance. The binder composition for a non-aqueous secondary battery porous membrane contains a particulate polymer A and a particulate polymer B having a larger volume-average particle diameter than the particulate polymer A. The particulate polymer A includes a (meth) acrylic acid alkyl ester monomer unit in a proportion of not less than 50 mass % and not more than 90 mass %. The particulate polymer B has a core-shell structure and includes a nitrile group-containing monomer unit in a core portion of the core-shell structure.

8 Claims, No Drawings

BINDER COMPOSITION FOR NON-AQUEOUS SECONDARY BATTERY POROUS MEMBRANE, SLURRY COMPOSITION FOR NON-AQUEOUS SECONDARY BATTERY POROUS MEMBRANE, POROUS MEMBRANE FOR NON-AQUEOUS SECONDARY BATTERY, AND NON-AQUEOUS SECONDARY BATTERY AND PRODUCTION METHOD THEREFOR

TECHNICAL FIELD

The present disclosure relates to a binder composition for a non-aqueous secondary battery porous membrane, a slurry composition for a non-aqueous secondary battery porous membrane, a porous membrane for a non-aqueous secondary battery, and a non-aqueous secondary battery and production method therefor.

BACKGROUND

Non-aqueous secondary batteries (hereinafter, also referred to simply as "secondary batteries"), such as lithium ion secondary batteries, have characteristics such as compact size, light weight, high energy density, and the ability to be repeatedly charged and discharged, and are used in a wide variety of applications. A secondary battery normally includes battery components such as a positive electrode, a negative electrode, and a separator that separates the positive electrode and the negative electrode, and prevents short-circuiting between the positive electrode and the negative electrode. There are cases in which a porous membrane is provided as a protective layer on an electrode (positive electrode or negative electrode) or a separator in a secondary battery with the aim of improving heat resistance and strength thereof.

A porous membrane such as described above can for example be formed by non-conductive particles, such as organic particles or inorganic particles, bound by a binder. This kind of porous membrane is typically formed by preparing a slurry composition (hereinafter, also referred to as a "slurry composition for a porous membrane") containing porous membrane materials, such as non-conductive particles and a binder, that are dissolved or dispersed in a dispersion medium, such as water, applying the slurry composition for a porous membrane onto a substrate, such as an electrode or a separator, and drying the applied slurry composition for a porous membrane.

In recent years, there has been much activity directed toward improving porous membranes with the aim of providing non-aqueous secondary batteries having even higher performance (for example, refer to Patent Literature (PTL) 1).

In one specific example, PTL 1 proposes that a functional layer having excellent adhesiveness both before and after immersion in electrolyte solution can be formed and life characteristics of a non-aqueous secondary battery can be enhanced by using a binder for a non-aqueous secondary battery functional layer containing a particulate polymer that is a copolymer including a (meth)acrylic acid alkyl ester monomer unit in a proportion of 35 mass % or more, an aromatic monovinyl monomer unit in a proportion of not less than 20 mass % and not more than 55 mass %, and an epoxy/N-methylol-based crosslinkable monomer unit in a proportion of not less than 0.1 mass % and not more than 5 mass %.

CITATION LIST

Patent Literature

PTL 1: JP 2016-154107 A

SUMMARY

Technical Problem

A functional layer is required to have low tendency for heat shrinkage upon a rise in the internal temperature of a cell in which an abnormal reaction such as a short-circuit or overcharging has occurred, and thus have excellent heat shrinkage resistance.

Moreover, in a production process of non-aqueous secondary batteries, battery components produced in an elongated form are typically wound up in this form for storage and transport. However, if a battery component including a porous membrane, such as a porous membrane-equipped electrode or a porous membrane-equipped separator, is stored and transported in a wound state, adjacent battery components may adhere via the porous membrane. In other words, defects may arise and productivity may decrease due to blocking. Accordingly, a battery component that includes a porous membrane is required to have the capability of inhibiting blocking during a production process (i.e., blocking resistance).

Although a binder for a non-aqueous secondary battery functional layer that can form a functional layer having excellent adhesiveness both before and after immersion in electrolyte solution and that can enhance life characteristics of a non-aqueous secondary battery is disclosed in PTL 1, there is room for improvement in terms of heat shrinkage resistance in electrolyte solution and blocking resistance of the functional layer (porous membrane).

Accordingly, an objective of the present disclosure is to provide a binder composition for a non-aqueous secondary battery porous membrane capable of forming a porous membrane having improved adhesiveness in electrolyte solution, heat shrinkage resistance in electrolyte solution, and blocking resistance.

Another objective of the present disclosure is to provide a slurry composition for a non-aqueous secondary battery porous membrane capable of forming a porous membrane having improved adhesiveness in electrolyte solution, heat shrinkage resistance in electrolyte solution, and blocking resistance.

Yet another objective of the present disclosure is to provide a porous membrane for a non-aqueous secondary battery having improved adhesiveness in electrolyte solution, heat shrinkage resistance in electrolyte solution, and blocking resistance, and a non-aqueous secondary battery including this porous membrane for a non-aqueous secondary battery.

Solution to Problem

The inventor conducted diligent investigation with the aim of solving the problems set forth above. The inventor discovered that by using a binder composition for a non-aqueous secondary battery porous membrane containing (i) a particulate polymer A that includes a (meth)acrylic acid alkyl ester monomer unit in a specific amount and (ii) a particulate polymer B that has a larger volume-average particle diameter than the particulate polymer A, has a core-shell structure, and includes a nitrile group-containing monomer unit in a core portion of the core-shell structure, it is possible to simultaneously achieve improvement of porous membrane adhesiveness in electrolyte solution, improvement of porous membrane heat shrinkage resistance in electrolyte solution, and improvement of porous membrane blocking resistance, and in this manner completed the present disclosure.

Specifically, the present disclosure aims to advantageously solve the problems set forth above by disclosing a binder composition for a non-aqueous secondary battery porous membrane comprising: a particulate polymer A; and a particulate polymer B having a larger volume-average particle diameter than the particulate polymer A, wherein the particulate polymer A includes a (meth)acrylic acid alkyl ester monomer unit in a proportion of not less than 50 mass % and not more than 90 mass %, and the particulate polymer B has a core-shell structure and includes a nitrile group-containing monomer unit in a core portion of the core-shell structure. By using a binder composition for a non-aqueous secondary battery porous membrane containing (i) a particulate polymer A that includes a (meth)acrylic acid alkyl ester monomer unit in a specific amount and (ii) a particulate polymer B that has a larger volume-average particle diameter than the particulate polymer A, has a core-shell structure, and includes a nitrile group-containing monomer unit in a core portion of the core-shell structure as set forth above, it is possible to simultaneously achieve improvement of porous membrane adhesiveness in electrolyte solution, improvement of porous membrane heat shrinkage resistance in electrolyte solution, and improvement of porous membrane blocking resistance.

In the presently disclosed binder composition for a non-aqueous secondary battery porous membrane, the particulate polymer B preferably includes the nitrile group-containing monomer unit in a proportion of not less than 20 mass % and not more than 80 mass % in the core portion. When the percentage content of the nitrile group-containing monomer unit present in the core portion of the particulate polymer B is 20 mass % or more with the overall particulate polymer B (total amount of core-forming monomer units and shell-forming monomer units) taken to be 100 mass %, polymer strength can be increased in accompaniment to suppressing the degree of swelling of an obtained porous membrane, which enables improvement of adhesiveness and heat resistance, whereas, when the percentage content of the nitrile group-containing monomer unit is 80 mass % or less, the particulate polymer B can be prevented from having a high glass-transition temperature Tg, reduction of deformability of an obtained porous membrane during pressing can be prevented, and adhesiveness in electrolyte solution and heat shrinkage resistance in electrolyte solution of an obtained porous membrane can be improved.

In the presently disclosed binder composition for a non-aqueous secondary battery porous membrane, the particulate polymer B preferably further includes an acidic group-containing monomer unit in a proportion of not less than 0.1 mass % and not more than 3.0 mass % in the core portion. When the percentage content of the acidic group-containing monomer unit present in the core portion of the particulate polymer B is 0.1 mass % or more with the overall particulate polymer B (total amount of core-forming monomer units and shell-forming monomer units) taken to be 100 mass %, reduction in polymerization stability of the particulate polymer B can be prevented, formation of aggregates can be prevented, and output characteristics of an obtained secondary battery can be improved. On the other hand, when the percentage content of the acidic group-containing monomer unit present in the core portion of the particulate polymer B is 3.0 mass % or less with the overall particulate polymer B (total amount of core-forming monomer units and shell-forming monomer units) taken to be 100 mass %, an increase in the water content of an obtained porous membrane (i.e., the amount of water imported into a secondary battery) can be prevented, and output characteristics of an obtained secondary battery can be improved.

In the presently disclosed binder composition for a non-aqueous secondary battery porous membrane, the particulate polymer A preferably has a volume-average particle diameter of not less than 50 nm and not more than 250 nm. Filling of pores in an obtained porous membrane can be prevented and output characteristics of an obtained secondary battery can be improved when the volume-average particle diameter of the particulate polymer A is 50 nm or more, whereas reduction of adhesion area can be prevented, and adhesiveness in electrolyte solution and heat shrinkage resistance in electrolyte solution of an obtained porous membrane can be improved when the volume-average particle diameter of the particulate polymer A is 250 nm or less.

In the presently disclosed binder composition for a non-aqueous secondary battery porous membrane, the particulate polymer B preferably has a volume-average particle diameter of not less than 300 nm and not more than 1,000 nm. Filling of pores in an obtained porous membrane can be prevented and output characteristics of an obtained secondary battery can be improved when the volume-average particle diameter of the particulate polymer B is 300 nm or more, whereas reduced leveling ability in application of a slurry composition for a porous membrane can be prevented and output characteristics of an obtained secondary battery can be improved when the volume-average particle diameter of the particulate polymer B is 1,000 nm or less.

Moreover, a presently disclosed slurry composition for a non-aqueous secondary battery porous membrane comprises any one of the binder compositions for a non-aqueous secondary battery porous membrane set forth above and non-conductive particles. By forming a porous membrane using a slurry composition that contains any one of the binder compositions for a non-aqueous secondary battery porous membrane set forth above, it is possible to obtain a porous membrane for which improvement of adhesiveness in electrolyte solution, improvement of heat shrinkage resistance in electrolyte solution, and improvement of blocking resistance are simultaneously achieved.

A presently disclosed porous membrane for a non-aqueous secondary battery is formed from the slurry composition for a non-aqueous secondary battery porous membrane set forth above. Improvement of adhesiveness in electrolyte solution, improvement of heat shrinkage resistance in electrolyte solution, and improvement of blocking resistance are simultaneously achieved with this porous membrane.

A presently disclosed non-aqueous secondary battery comprises a positive electrode, a negative electrode, a separator, and an electrolyte solution, wherein at least one battery component selected from the group consisting of the positive electrode, the negative electrode, and the separator includes the porous membrane for a non-aqueous secondary battery set forth above. This non-aqueous secondary battery is a high-performance secondary battery in which adhesiveness of the porous membrane with a battery component and heat shrinkage resistance of the porous membrane in the electrolyte solution are excellent.

Furthermore, a presently disclosed non-aqueous secondary battery production method for producing the presently disclosed non-aqueous secondary battery comprises adhering the separator and at least one of the positive electrode and the negative electrode via the porous membrane for a non-aqueous secondary battery. This non-aqueous secondary battery production method enables production of a high-performance non-aqueous secondary battery in which adhesiveness of a porous membrane with a battery component and heat shrinkage resistance of the porous membrane in electrolyte solution are excellent.

In the presently disclosed non-aqueous secondary battery production method, the adhering preferably includes either or both of pressing and heating a battery component roll (laminate) in which the separator and at least one of the positive electrode and the negative electrode are wound (stacked) via the porous membrane for a non-aqueous secondary battery.

Advantageous Effect

According to the present disclosure, it is possible to provide a binder composition for a non-aqueous secondary battery porous membrane capable of forming a porous membrane having improved adhesiveness in electrolyte solution, heat shrinkage resistance in electrolyte solution, and blocking resistance.

Moreover, according to the present disclosure, it is possible to provide a slurry composition for a non-aqueous secondary battery porous membrane capable of forming a porous membrane having improved adhesiveness in electrolyte solution, heat shrinkage resistance in electrolyte solution, and blocking resistance.

Furthermore, according to the present disclosure, it is possible to provide a porous membrane for a non-aqueous secondary battery having improved adhesiveness in electrolyte solution, heat shrinkage resistance in electrolyte solution, and blocking resistance, and a non-aqueous secondary battery including this porous membrane for a non-aqueous secondary battery.

DETAILED DESCRIPTION

The following provides a detailed description of embodiments of the present disclosure.

The presently disclosed binder composition for a non-aqueous secondary battery porous membrane is used as a material in production of a slurry composition for a non-aqueous secondary battery porous membrane. Moreover, the presently disclosed slurry composition for a non-aqueous secondary battery porous membrane is produced using the presently disclosed binder composition for a non-aqueous secondary battery porous membrane. Furthermore, the presently disclosed porous membrane for a non-aqueous secondary battery is formed using the presently disclosed slurry composition for a non-aqueous secondary battery porous membrane. Also, the presently disclosed non-aqueous secondary battery includes the presently disclosed porous membrane for a non-aqueous secondary battery in at least one battery component.

Binder Composition for Non-Aqueous Secondary Battery Porous Membrane

The presently disclosed binder composition for a porous membrane is a composition that contains a particulate polymer A having binding capacity and a particulate polymer B having a larger volume-average particle diameter than the particulate polymer A, and that may optionally contain water and other components (for example, a wetting agent, a defoamer, a leveling agent, a dispersant, and a preservative). The presently disclosed binder composition for a porous membrane may further contain a small amount of an organic solvent or the like.

The particulate polymer A at least has a feature of including a (meth)acrylic acid alkyl ester monomer unit in a proportion of not less than 50 mass % and not more than 90 mass %.

The particulate polymer B at least has a feature of having a core-shell structure and including a nitrile group-containing monomer unit in a core portion of the core-shell structure.

A porous membrane formed using the presently disclosed binder composition for a porous membrane has excellent adhesiveness in electrolyte solution, heat shrinkage resistance in electrolyte solution, and blocking resistance. Moreover, a secondary battery having excellent output characteristics can be obtained using the presently disclosed binder composition for a porous membrane.

The following provides a detailed description of the particulate polymer A and the particulate polymer B that are contained in the presently disclosed binder composition for a non-aqueous secondary battery porous membrane.

Particulate Polymer A

The particulate polymer A ensures strength of an obtained porous membrane and also holds components contained in the porous membrane so that these components do not become detached from the porous membrane.

The particulate polymer A is normally a polymer that is present in the form of particles in an aqueous medium and that is not water-soluble. Moreover, the particulate polymer A does not normally have a core-shell structure.

A constituent polymer of the particulate polymer A is required to include a (meth)acrylic acid alkyl ester monomer unit and preferably further includes an acidic group-containing monomer unit, an aromatic monovinyl monomer unit, and/or other monomer units.

The phrase "includes a monomer unit" as used herein means that "a polymer obtained with the monomer includes a structural unit derived from the monomer". Moreover, "(meth)acryl" is used to indicate "acryl" and/or "methacryl".

(Meth)acrylic acid alkyl ester monomer unit

Examples of (meth)acrylic acid alkyl ester monomers that can form a (meth)acrylic acid alkyl ester monomer unit include acrylic acid alkyl esters such as methyl acrylate, ethyl acrylate, n-propyl acrylate, isopropyl acrylate, n-butyl acrylate, t-butyl acrylate, isobutyl acrylate, n-pentyl acrylate, isopentyl acrylate, hexyl acrylate, heptyl acrylate, octyl acrylate, 2-ethylhexyl acrylate, nonyl acrylate, decyl acrylate, lauryl acrylate, n-tetradecyl acrylate, and stearyl acrylate; and methacrylic acid alkyl esters such as methyl methacrylate, ethyl methacrylate, n-propyl methacrylate, isopropyl methacrylate, n-butyl methacrylate, t-butyl methacrylate, isobutyl methacrylate, n-pentyl methacrylate, isopentyl methacrylate, hexyl methacrylate, heptyl methacrylate, octyl methacrylate, 2-ethylhexyl methacrylate, nonyl methacrylate, decyl methacrylate, lauryl methacrylate, n-tetradecyl methacrylate, and stearyl methacrylate. Of these (meth)acrylic acid alkyl ester monomers, the inclusion of a (meth)acrylic acid alkyl ester in which an alkyl group bonded to a non-carbonyl oxygen atom has a carbon number of not less than 8 and not more than 15 is preferable, and the inclusion of only a (meth)acrylic acid alkyl ester in which an alkyl group bonded to a non-carbonyl oxygen atom has a carbon number of not less than 8 and not more than 15 is more preferable from a viewpoint of further improving blocking resistance and adhesiveness. The (meth)acrylic acid alkyl ester in which an alkyl group bonded to a non-carbonyl oxygen atom has a carbon number of not less than 8 and not more than 15 is, for example, preferably octyl acrylate, 2-ethylhexyl acrylate (2-EHA), nonyl acrylate, decyl acrylate, lauryl acrylate, n-tetradecyl acrylate, stearyl acrylate, octyl methacrylate, 2-ethylhexyl methacrylate, nonyl methacrylate, decyl methacrylate, lauryl methacrylate, n-tetradecyl methacrylate, or stearyl methacrylate, and is more preferably 2-ethylhexyl acrylate (2-EHA). One of these (meth)acrylic acid alkyl esters may be used individually, or two or more of these (meth)acrylic acid alkyl esters may be used in combination.

The glass-transition temperature Tg of the particulate polymer A can be lowered and adhesive strength of an obtained porous membrane in electrolyte solution can be improved when the carbon number of the alkyl group bonded to the non-carbonyl oxygen atom is 8 or more, whereas an obtained porous membrane can be prevented from having a high degree of swelling, adhesiveness of an obtained porous membrane in electrolyte solution can be improved, and output characteristics of an obtained secondary battery can be improved when the carbon number of the alkyl group bonded to the non-carbonyl oxygen atom is 15 or less.

The percentage content of the (meth)acrylic acid alkyl ester monomer unit when the amount of all monomer units included in the particulate polymer A is taken to be 100 mass % is 50 mass % or more, preferably 55 mass % or more, more preferably 60 mass % or more, even more preferably 65 mass % or more, and particularly preferably 66 mass % or more, and is 90 mass % or less, preferably 80 mass % or less, more preferably 75 mass % or less, and particularly preferably 70 mass % or less. When the percentage content of the (meth)acrylic acid alkyl ester monomer unit is 50 mass % or more, an obtained porous membrane can be prevented from having a high degree of swelling, adhesiveness of an obtained porous membrane in electrolyte solution can be improved, and output characteristics of an obtained secondary battery can be improved. On the other hand, when the percentage content of the (meth)acrylic acid alkyl ester monomer unit is 90 mass % or less, the particulate polymer A can be prevented from having a low glass-transition temperature Tg, blocking resistance of an obtained porous membrane can be improved, excessive reduction of the degree of swelling can be prevented, adhesiveness of an obtained porous membrane in electrolyte solution can be improved, and heat shrinkage resistance of an obtained porous membrane in electrolyte solution can be improved.

Acidic Group-Containing Monomer Unit

Examples of acidic group-containing monomers that can form an acidic group-containing monomer unit include carboxy group-containing (carboxylic acid group-containing) monomers, sulfo group-containing monomers, and phosphate group-containing monomers.

Examples of carboxy group-containing monomers that can be used include ethylenically unsaturated monocarboxylic acids, derivatives of ethylenically unsaturated monocarboxylic acids, ethylenically unsaturated dicarboxylic acids, acid anhydrides of ethylenically unsaturated dicarboxylic acids, and derivatives of ethylenically unsaturated dicarboxylic acids and acid anhydrides thereof.

Examples of ethylenically unsaturated monocarboxylic acids include acrylic acid (AA), methacrylic acid (MAA), and crotonic acid. Examples of derivatives of ethylenically unsaturated monocarboxylic acids include 2-ethylacrylic acid, isocrotonic acid, α-acetoxyacrylic acid, β-trans-aryloxyacrylic acid, α-chloro-β-E-methoxyacrylic acid, and β-diaminoacrylic acid.

Examples of ethylenically unsaturated dicarboxylic acids include maleic acid, fumaric acid, and itaconic acid. Examples of acid anhydrides of ethylenically unsaturated dicarboxylic acids include maleic anhydride, acrylic anhydride, methylmaleic anhydride, and dimethylmaleic anhydride. Examples of derivatives of ethylenically unsaturated dicarboxylic acids include methylmaleic acid, dimethylmaleic acid, phenylmaleic acid, chloromaleic acid, dichloromaleic acid, fluoromaleic acid, diphenyl maleate, nonyl maleate, decyl maleate, dodecyl maleate, octadecyl maleate, and fluoroalkyl maleates.

Examples of sulfo group-containing monomers include vinyl sulfonic acid, methyl vinyl sulfonic acid, (meth)allyl sulfonic acid, (meth)acrylic acid 2-sulfoethyl, 2-acrylamido-2-methylpropane sulfonic acid, and 3-allyloxy-2-hydroxypropane sulfonic acid.

In the present disclosure, "(meth)allyl" is used to indicate "allyl" and/or "methallyl".

Examples of phosphate group-containing monomers include 2-(meth)acryloyloxyethyl phosphate, methyl-2-(meth)acryloyloxyethyl phosphate, and ethyl-(meth)acryloyloxyethyl phosphate.

In the present disclosure, "(meth)acryloyl" is used to indicate "acryloyl" and/or "methacryloyl".

Of these acidic group-containing monomers, carboxy group-containing (carboxylic acid group-containing) monomers and sulfo group-containing monomers are preferable, ethylenically unsaturated monocarboxylic acids are more preferable, and acrylic acid (AA) and methacrylic acid (MAA) are even more preferable.

The percentage content of the acidic group-containing monomer unit when the amount of all monomer units included in the particulate polymer A is taken to be 100 mass % is preferably 1 mass % or more, more preferably 2 mass % or more, and particularly preferably 2.5 mass % or more, and is preferably 10 mass % or less, more preferably 8 mass % or less, particularly preferably 5 mass % or less, and particularly preferably 3.5 mass % or less. When the percentage content of the acidic group-containing monomer unit is 1 mass % or more, reduction of polymerization stability of the particulate polymer A can be prevented, formation of aggregates can be prevented, and output characteristics of an obtained secondary battery can be improved. On the other hand, when the percentage content of the acidic group-containing monomer unit is 10 mass % or less, an increase in the water content of an obtained porous membrane (i.e., the amount of water imported into a secondary battery) can be prevented, and output characteristics of an obtained secondary battery can be improved.

Aromatic Monovinyl Monomer Unit

Examples of aromatic monovinyl monomers that can form an aromatic monovinyl monomer unit include styrene, styrenesulfonic acid and salts thereof (for example, sodium styrenesulfonate), α-methylstyrene, vinyltoluene, and 4-(tert-butoxy)styrene. Of these aromatic monovinyl monomers, styrene and sodium styrenesulfonate are preferable. Styrene is particularly preferable as an aromatic monovinyl monomer from a viewpoint of polymerization stability and swelling in electrolyte solution. One of these aromatic monovinyl monomers may be used individually, or two or more of these aromatic monovinyl monomers may be used in combination.

The percentage content of the aromatic monovinyl monomer unit when the amount of all monomer units included in the particulate polymer A is taken to be 100 mass % is preferably 5 mass % or more, more preferably 10 mass % or more, even more preferably 15 mass % or more, particularly preferably 20 mass % or more, and most preferably 24 mass % or more, and is preferably 40 mass % or less, and more preferably 30 mass % or less. When the percentage content of the aromatic monovinyl monomer unit is 5 mass % or more, the particulate polymer A can be prevented from having a low glass-transition temperature Tg, blocking resistance of an obtained porous membrane can be improved, excessive reduction of the degree of swelling can be prevented, adhesiveness of an obtained porous membrane in electrolyte solution can be improved, and heat shrinkage resistance of an obtained porous membrane in electrolyte solution can be improved. On the other hand, when the percentage content of the aromatic monovinyl monomer unit is 40 mass % or less, the particulate polymer A can be prevented from having a high glass-transition temperature Tg, adhesiveness of an obtained porous membrane in electrolyte solution can be improved, and heat shrinkage resistance of an obtained porous membrane in electrolyte solution can be improved.

Other Monomer Units

The particulate polymer A may include other monomer units besides the (meth)acrylic acid alkyl ester monomer unit, the acidic group-containing monomer unit, and the aromatic monovinyl monomer unit described above. Examples of such other monomer units include, but are not specifically limited to, a crosslinkable monomer unit and so forth.

As described above, a crosslinkable monomer unit is a monomer unit other than the (meth)acrylic acid alkyl ester monomer unit, the acidic group-containing monomer unit, and the aromatic monovinyl monomer unit. Accordingly, examples of crosslinkable monomers that can form a crosslinkable monomer unit do not include the (meth)acrylic acid alkyl ester monomers, acidic group-containing monomers, and aromatic monovinyl monomers described above.

Crosslinkable Monomer Unit

A monomer that can form a crosslinked structure when polymerized may be used as a crosslinkable monomer that can form a crosslinkable monomer unit. Specific examples include a monofunctional monomer having a thermally crosslinkable group and one ethylenic double bond per molecule, and a polyfunctional monomer having two or more ethylenic double bonds per molecule. Examples of the thermally crosslinkable group included in the monofunctional monomer include an epoxy group, an N-methylol amide group, an oxetanyl group, an oxazoline group, and combinations thereof. The inclusion of a crosslinkable monomer unit can reduce the degree of swelling of the copolymer in electrolyte solution and inhibit elution into electrolyte solution.

The crosslinkable monomer may be hydrophobic or hydrophilic, and the inclusion of both a hydrophobic crosslinkable monomer (hydrophobic crosslinking agent) and a hydrophilic crosslinkable monomer (hydrophilic crosslinking agent) is preferable.

When a crosslinkable monomer is referred to as "hydrophobic" in the present disclosure, this means that the crosslinkable monomer does not include a hydrophilic group. In contrast, when a crosslinkable monomer is referred to as "hydrophilic" in the present disclosure, this means that the crosslinkable monomer includes a hydrophilic group. The term "hydrophilic group" used with respect to a crosslinkable monomer refers to a carboxy group, a hydroxy group, a sulfo group, a phosphate group, an epoxy group, a thiol group, an aldehyde group, an amide group, an oxetanyl group, or an oxazoline group.

Examples of hydrophobic crosslinkable monomers (hydrophobic crosslinking agents) include polyfunctional (meth)acrylates such as allyl (meth)acrylate (AMA, etc.), ethylene di(meth)acrylate, diethylene glycol di(meth)acrylate, triethylene glycol di(meth)acrylate, tetraethylene glycol di(meth)acrylate, and trimethylolpropane tri(meth)acrylate; polyfunctional allyl/vinyl ethers such as dipropylene glycol diallyl ether, polyglycol diallyl ether, triethylene glycol divinyl ether, hydroquinone diallyl ether, and tetraallyloxyethane; and divinylbenzene.

Examples of hydrophilic crosslinkable monomers (hydrophilic crosslinking agents) include vinyl glycidyl ether, allyl glycidyl ether (AGE), methylolacrylamide, acrylamide, and glycidyl methacrylate.

In the present disclosure, "(meth)acrylate" is used to indicate "acrylate" and/or "methacrylate".

One of these crosslinkable monomers may be used individually, or two or more of these crosslinkable monomers may be used in combination.

The percentage content of the crosslinkable monomer unit when the amount of all monomer units included in the particulate polymer A is taken to be 100 mass % is preferably 0.1 mass % or more, and more preferably 1 mass % or more, and is preferably 5 mass % or less, and more preferably 3 mass % or less.

When the percentage content of a hydrophobic crosslinkable monomer unit of allyl (meth)acrylate (AMA, etc.) or the like is 0.1 mass % or more (preferably 0.3 mass % or more) with the amount of all monomer units included in the particulate polymer A taken to be 100 mass %, reduction of gel content can be prevented, increased elution in electrolyte solution can be prevented, and output characteristics of an obtained secondary battery can be improved. On the other hand, when the percentage content of the hydrophobic crosslinkable monomer unit is 5 mass % or less, reduction of polymerization stability of the particulate polymer A can be prevented, formation of aggregates can be prevented, and output characteristics of an obtained secondary battery can be improved.

When the percentage content of a hydrophilic crosslinkable monomer unit of allyl glycidyl ether (AGE) or the like is 0.1 mass % or more (preferably 1.7 mass % or more) with the amount of all monomer units included in the particulate polymer A taken to be 100 mass %, reduction of interface strength of the particulate polymer A and subsequently described non-conductive particles can be prevented, and adhesiveness of an obtained porous membrane in electrolyte solution can be improved. On the other hand, when the percentage content of the hydrophilic crosslinkable monomer unit is 5 mass % or less, increased viscosity of a slurry composition for a porous membrane can be prevented, reduced leveling ability in application can be prevented, and output characteristics of an obtained secondary battery can be improved.

Production of Particulate Polymer

The particulate polymer A is produced through polymerization of a monomer composition that contains the monomers described above.

The percentage content of each monomer in the monomer composition is usually the same as the percentage content of the corresponding monomer unit in the desired particulate polymer A.

No specific limitations are placed on the mode of polymerization of the particulate polymer A. For example, any of solution polymerization, suspension polymerization, bulk polymerization, and emulsion polymerization may be used. The polymerization reaction may be, for example, addition polymerization such as ionic polymerization, radical polymerization, or living radical polymerization. Commonly used emulsifiers, dispersants, polymerization initiators, polymerization aids, and the like may be used in the polymerization in an amount that is also the same as commonly used.

Properties of Particulate Polymer A

The particulate polymer A is preferably a random copolymer. The following provides a detailed description of properties of the particulate polymer A including these properties.

Volume-Average Particle Diameter

The volume-average particle diameter D50 of the particulate polymer A is preferably 50 nm or more, more preferably 100 nm or more, particularly preferably 120 nm or more, and most preferably 180 nm or more, and is preferably 250 nm or less, more preferably 230 nm or less, and even more preferably 210 nm or less. When the volume-average particle diameter of the particulate polymer A is 50 nm or more, filling of pores in an obtained porous membrane can be prevented, and output characteristics of an obtained secondary battery can be improved. On the other hand, when the volume-average particle diameter of the particulate polymer A is 250 nm or less, reduction of adhesion area can be prevented, adhesiveness of an obtained porous membrane in electrolyte solution can be improved, and heat shrinkage resistance of an obtained porous membrane in electrolyte solution can be improved.

The volume average particle diameter D50 of the particulate polymer A can be measured by a measurement method described in the EXAMPLES section.

Glass-Transition Temperature Tg

The glass-transition temperature Tg of the particulate polymer A is preferably −40° C. or higher, more preferably −35° C. or higher, particularly preferably −30° C. or higher, and most preferably −25° C. or higher, and is preferably 20° C. or lower, more preferably 10° C. or lower, even more preferably 0° C. or lower, particularly preferably −10° C. or lower, and most preferably −15° C. or lower. Blocking resistance of an obtained porous membrane can be improved when the glass-transition temperature Tg of the particulate polymer A is −40° C. or higher. On the other hand, adhesiveness of an obtained porous membrane in electrolyte solution can be improved when the glass-transition temperature Tg of the particulate polymer A is 20° C. or lower.

The glass-transition temperature Tg of the particulate polymer A can be measured by a measurement method described in the EXAMPLES section.

Particulate Polymer B

The particulate polymer B has a core-shell structure including a core portion and a shell portion.

The particulate polymer B is normally a polymer that is present in the form of particles in an aqueous medium and that is not water-soluble.

Core Portion

Monomer units forming the core portion of the particulate polymer B are required to include a nitrile group-containing monomer unit and preferably also include an acidic group-containing monomer unit. The core portion of the particulate polymer B may include other monomer units besides the nitrile group-containing monomer unit and the acidic group-containing monomer unit mentioned above.

Nitrile Group-Containing Monomer Unit

Examples of nitrile group-containing monomers that can form a nitrile group-containing monomer unit include α,β-ethylenically unsaturated nitrile monomers. Specifically, any α,β-ethylenically unsaturated compound that has a nitrile group can be used as an α,β-ethylenically unsaturated nitrile monomer without any specific limitations. Examples include acrylonitrile; α-halogenoacrylonitriles such as α-chloroacrylonitrile and α-bromoacrylonitrile; and α-alkylacrylonitriles such as methacrylonitrile and α-ethylacrylonitrile. Of these nitrile group-containing monomers, acrylonitrile and methacrylonitrile are preferable.

One of these nitrile group-containing monomers may be used individually, or two or more of these nitrile group-containing monomers may be used in combination.

The percentage content of the nitrile group-containing monomer unit present in the core portion of the particulate polymer B when the overall particulate polymer B (total amount of core-forming monomer units and shell-forming monomer units) is taken to be 100 mass % is preferably 23 mass % or more, more preferably 25 mass % or more, even more preferably 25.7 mass % or more, and particularly preferably 28.6 mass % or more, and is preferably 50 mass % or less, more preferably 45 mass % or less, and particularly preferably 31.4 mass % or less. When the percentage content of the nitrile group-containing monomer unit is 23 mass % or more, the particulate polymer B can be prevented from having a high degree of swelling, adhesiveness of an obtained porous membrane to a battery component in electrolyte solution can be improved, and heat shrinkage resistance of an obtained porous membrane in electrolyte solution can be improved. On the other hand, when the percentage content of the nitrile group-containing monomer unit is 50 mass % or less, the particulate polymer B can be prevented from having a high glass-transition temperature Tg, reduction of deformability of an obtained porous membrane during pressing can be prevented, adhesiveness of an obtained porous membrane in electrolyte solution can be improved, and heat shrinkage resistance of an obtained porous membrane in electrolyte solution can be improved.

Acidic Group-Containing Monomer Unit

Examples of acidic group-containing monomers that can form an acidic group-containing monomer unit include carboxy group-containing monomers, sulfo group-containing monomers, and phosphate group-containing monomers.

Examples of carboxy group-containing monomers that can be used include ethylenically unsaturated monocarboxylic acids, derivatives of ethylenically unsaturated monocarboxylic acids, ethylenically unsaturated dicarboxylic acids, acid anhydrides of ethylenically unsaturated dicarboxylic acids, and derivatives of ethylenically unsaturated dicarboxylic acids and acid anhydrides thereof.

Examples of ethylenically unsaturated monocarboxylic acids include acrylic acid (AA), methacrylic acid (MAA), and crotonic acid. Examples of derivatives of ethylenically unsaturated monocarboxylic acids include 2-ethylacrylic acid, isocrotonic acid, α-acetoxyacrylic acid, β-trans-aryloxyacrylic acid, α-chloro-β-E-methoxyacrylic acid, and β-diaminoacrylic acid.

Examples of ethylenically unsaturated dicarboxylic acids include maleic acid, fumaric acid, and itaconic acid. Examples of acid anhydrides of ethylenically unsaturated dicarboxylic acids include maleic anhydride, acrylic anhydride, methylmaleic anhydride, and dimethylmaleic anhydride. Examples of derivatives of ethylenically unsaturated dicarboxylic acids include methylmaleic acid, dimethylmaleic acid, phenylmaleic acid, chloromaleic acid, dichloromaleic acid, fluoromaleic acid, diphenyl maleate, nonyl maleate, decyl maleate, dodecyl maleate, octadecyl maleate, and fluoroalkyl maleates.

Examples of sulfo group-containing monomers include vinyl sulfonic acid, methyl vinyl sulfonic acid, (meth)allyl sulfonic acid, (meth)acrylic acid 2-sulfoethyl, 2-acrylamido-2-methylpropane sulfonic acid, and 3-allyloxy-2-hydroxypropane sulfonic acid.

Examples of phosphate group-containing monomers include 2-(meth)acryloyloxyethyl phosphate, methyl-2-(meth)acryloyloxyethyl phosphate, and ethyl-(meth)acryloyloxyethyl phosphate.

Of these acidic group-containing monomers, carboxy group-containing monomers and sulfo group-containing monomers are preferable, ethylenically unsaturated monocarboxylic acids are more preferable, and acrylic acid (AA) and methacrylic acid (MAA) are even more preferable.

The percentage content of the acidic group-containing monomer unit present in the core portion of the particulate polymer B when the overall particulate polymer B (total amount of core-forming monomer units and shell-forming monomer units) is taken to be 100 mass % is preferably 0.1 mass % or more, more preferably 0.5 mass % or more, and particularly preferably 0.7 mass % or more, and is preferably 3.0 mass % or less, and more preferably 2.0 mass % or less. When the percentage content of the acidic group-containing monomer unit is 0.1 mass % or more, reduction of polymerization stability of the particulate polymer B can be prevented, formation of aggregates can be prevented, and output characteristics of an obtained secondary battery can be improved. On the other hand, when the percentage content of the acidic group-containing monomer unit is 3 mass % or less, an increase in the water content of an obtained porous membrane (i.e., the amount of water imported into a secondary battery) can be prevented, and output characteristics of an obtained secondary battery can be improved.

Other Monomer Units

Examples of other monomer units include, but are not specifically limited to, a (meth)acrylic acid alkyl ester monomer unit and a crosslinkable monomer unit.

As described above, a crosslinkable monomer unit is a monomer unit other than the nitrile group-containing monomer unit. Examples of crosslinkable monomers that can form a crosslinkable monomer unit do not include the nitrile group-containing monomer unit and the acidic group-containing monomer unit described above and also do not include a (meth)acrylic acid alkyl ester monomer unit in the core portion and an aromatic monovinyl monomer unit in the shell portion that are described further below.

(Meth)acrylic acid alkyl ester monomer unit

Examples of (meth)acrylic acid alkyl ester monomers that can form a (meth)acrylic acid alkyl ester monomer unit include acrylic acid alkyl esters such as methyl acrylate, ethyl acrylate, n-propyl acrylate, isopropyl acrylate, n-butyl acrylate, t-butyl acrylate, isobutyl acrylate, n-pentyl acrylate, isopentyl acrylate, hexyl acrylate, heptyl acrylate, octyl acrylate, 2-ethylhexyl acrylate, nonyl acrylate, decyl acrylate, lauryl acrylate, n-tetradecyl acrylate, and stearyl acrylate; and methacrylic acid alkyl esters such as methyl methacrylate, ethyl methacrylate, n-propyl methacrylate, isopropyl methacrylate, n-butyl methacrylate, t-butyl methacrylate, isobutyl methacrylate, n-pentyl methacrylate, isopentyl methacrylate, hexyl methacrylate, heptyl methacrylate, octyl methacrylate, 2-ethylhexyl methacrylate, nonyl methacrylate, decyl methacrylate, lauryl methacrylate, n-tetradecyl methacrylate, and stearyl methacrylate. Of these (meth)acrylic acid alkyl ester monomers, a (meth)acrylic acid alkyl ester in which an alkyl group bonded to a non-carbonyl oxygen atom has a carbon number of not less than 1 and not more than 4 is preferable, and methyl methacrylate (MMA) and n-butyl acrylate (BA) are more preferable from a viewpoint of preventing the particulate polymer B from having a high glass-transition temperature Tg and improving adhesiveness of an obtained porous membrane.

One of these (meth)acrylic acid alkyl ester monomers may be used individually, or two or more of these (meth)acrylic acid alkyl ester monomers may be used in combination.

The percentage content of the (meth)acrylic acid alkyl ester monomer unit present in the core portion of the particulate polymer B when the overall particulate polymer B (total amount of core-forming monomer units and shell-forming monomer units) is taken to be 100 mass % is preferably 5 mass % or more, more preferably 22.6 mass % or more, even more preferably 23 mass % or more, and particularly preferably 23.6 mass % or more, and is preferably 50 mass % or less, more preferably 46.6 mass % or less, particularly preferably 40.6 mass % or less, and most preferably 38.6 mass % or less. When the percentage content of the (meth)acrylic acid alkyl ester monomer unit is 5 mass % or more, the particulate polymer B can be prevented from having a high glass-transition temperature Tg, reduction of deformability of an obtained porous membrane during pressing can be prevented, adhesiveness of an obtained porous membrane to a battery component in electrolyte solution can be improved, and heat shrinkage resistance of an obtained porous membrane in electrolyte solution can be improved. On the other hand, when the percentage content of the (meth)acrylic acid alkyl ester monomer unit is 50 mass % or less, an obtained porous membrane can be prevented from having a high degree of swelling, adhesiveness of an obtained porous membrane in electrolyte solution can be improved, heat shrinkage resistance of an obtained porous membrane in electrolyte solution can be improved, and output characteristics of an obtained secondary battery can be improved.

Crosslinkable Monomer Unit

A monomer that can form a crosslinked structure when polymerized may be used as a crosslinkable monomer that can form a crosslinkable monomer unit. Specific examples include a monofunctional monomer having a thermally crosslinkable group and one ethylenic double bond per molecule, and a polyfunctional monomer having two or more ethylenic double bonds per molecule. Examples of the thermally crosslinkable group included in the monofunctional monomer include an epoxy group, an N-methylol amide group, an oxetanyl group, an oxazoline group, and combinations thereof. The inclusion of a crosslinkable monomer unit can reduce the degree of swelling of the copolymer in electrolyte solution and inhibit elution into electrolyte solution.

The crosslinkable monomer may be hydrophobic or hydrophilic as previously described.

Examples of hydrophobic crosslinkable monomers (hydrophobic crosslinking agents) include polyfunctional (meth)acrylates such as allyl (meth)acrylate, ethylene di(meth)acrylate (EDMA, etc.), diethylene glycol di(meth)acrylate, triethylene glycol di(meth)acrylate, tetraethylene glycol di(meth)acrylate, and trimethylolpropane tri(meth)acrylate; polyfunctional allyl/vinyl ethers such as dipropylene glycol diallyl ether, polyglycol diallyl ether, triethylene glycol divinyl ether, hydroquinone diallyl ether, and tetraallyloxyethane; and divinylbenzene. Of these hydrophobic crosslinkable monomers, ethylene di(meth)acrylate (EDMA, etc.) is preferable.

Examples of hydrophilic crosslinkable monomers (hydrophilic crosslinking agents) include vinyl glycidyl ether, allyl glycidyl ether, methylolacrylamide, acrylamide, and glycidyl methacrylate.

In the present disclosure, "(meth)acrylate" is used to indicate "acrylate" and/or "methacrylate".

One of these crosslinkable monomers may be used individually, or two or more of these crosslinkable monomers may be used in combination.

The percentage content of the crosslinkable monomer unit present in the core portion of the particulate polymer B when the overall particulate polymer B (total amount of core-forming monomer units and shell-forming monomer units) is taken to be 100 mass % is preferably 0.1 mass % or more, more preferably 0.5 mass % or more, and particularly preferably 0.6 mass % or more, and is preferably 10 mass % or less, more preferably 2 mass % or less, and particularly preferably 0.8 mass % or less.

When the percentage content of the crosslinkable monomer unit present in the core portion of the particulate polymer B is 0.1 mass % or more with the overall particulate polymer B (total amount of core-forming monomer units and shell-forming monomer units) taken to be 100 mass %, the particulate polymer B can be prevented from having a high degree of swelling, and output characteristics of an obtained secondary battery can be improved. On the other hand, when the percentage content of the crosslinkable monomer unit present in the core portion of the particulate polymer B is 10 mass % or less with the overall particulate polymer B (total amount of core-forming monomer units and shell-forming monomer units) taken to be 100 mass %, the particulate polymer B can be prevented from having excessively high strength, reduction in deformability of an obtained porous membrane during pressing can be prevented, and adhesiveness of an obtained porous membrane can be improved.

The glass-transition temperature Tg of the core portion is not specifically limited, but may, for example, be 0° C. or higher, 10° C. or higher, 20° C. or higher, 30° C. or higher, or 50° C. or higher, and may, for example, be 150° C. or lower, 130° C. or lower, 110° C. or lower, 100° C. or lower, 90° C. or lower, or 80° C. or lower.

The diameter of the core portion relative to the volume-average particle diameter of the particulate polymer B, which is taken to be 100%, may, for example, be 50% or more, 60% or more, 70% or more, or 80% or more, and may, for example, be 99% or less, 98.5% or less, or 98% or less.

The diameter and the glass-transition temperature Tg of the core portion can be measured as the volume-average particle diameter and the glass-transition temperature Tg of a particulate polymer (core portion) that is obtained prior to shell portion formation in a production process of the particulate polymer B. The volume-average particle diameter represents the particle diameter at which, in a particle diameter distribution measured by laser diffraction, cumulative volume calculated from a small diameter end of the distribution reaches 50%.

Shell Portion

The shell portion at least partially covers the outer surface of the core portion. In one example, the shell portion partially covers the outer surface of the core portion. In terms of external appearance, even in a situation in which the outer surface of the core portion appears to be completely covered by the shell portion, the shell portion is still considered to be a shell portion that partially covers the outer surface of the core portion ("partially covered core-shell" in Table 1 described below) so long as pores are formed that pass between inside and outside of the shell portion. In another example, the shell portion completely covers the outer surface of the core portion.

It should be noted that the shell portion normally has a different chemical composition to the core portion.

Monomer units forming the shell portion are not specifically limited, but preferably include an aromatic monovinyl monomer unit, for example. The monomer units forming the shell portion may include other monomers units besides the aromatic monovinyl monomer unit.

Core-Shell Structure

The average proportion of the outer surface of the core portion that is partially covered by the shell portion is not specifically limited, but may, for example, be 10% or more, 30% or more, 40% or more, or 60% or more, and may, for example, be 99.9% or less, 98% or less, 95% or less, 90% or less, or 85% or less. With the average proportion of the outer surface of the core portion covered by the shell portion falling within any of the ranges set forth above, it is possible to ensure a good balance between ion conductivity and adhesiveness in electrolyte solution.

The average proportion of the outer surface of the core portion covered by the shell portion can be measured from the results of observation of cross-sectional structure of the particulate polymer. For example, this measurement may be carried out by a method described in WO 2015/064411 A1.

Aromatic Monovinyl Monomer Unit

Examples of aromatic monovinyl monomers that can form an aromatic monovinyl monomer unit include styrene, styrenesulfonic acid and salts thereof (for example, sodium styrenesulfonate), α-methylstyrene, vinyltoluene, and 4-(tert-butoxy)styrene. Of these aromatic monovinyl monomers, styrene and sodium styrenesulfonate are preferable. Styrene is particularly preferable as an aromatic monovinyl monomer from a viewpoint of polymerization stability and swelling in electrolyte solution. One of these aromatic monovinyl monomers may be used individually, or two or more of these aromatic monovinyl monomers may be used in combination.

The percentage content of the aromatic monovinyl monomer unit present in the shell portion of the particulate polymer B when the overall particulate polymer B (total amount of core-forming monomer units and shell-forming monomer units) is taken to be 100 mass % is preferably 10 mass % or more, and more preferably 25 mass % or more, and is preferably 35 mass % or less. When the percentage content of the aromatic monovinyl monomer unit present in the shell portion of the particulate polymer B is 1 mass % or more with the overall particulate polymer B (total amount of core-forming monomer units and shell-forming monomer units) taken to be 100 mass %, the particulate polymer B can be prevented from having a high degree of swelling, adhesiveness of an obtained porous membrane to a battery component in electrolyte solution can be improved, heat shrinkage resistance of an obtained porous membrane in electrolyte solution can be improved, output characteristics of an obtained secondary battery can be improved, the particulate polymer B can be prevented from having a low glass-transition temperature Tg, and blocking resistance of an obtained porous membrane can be improved. On the other hand, when the percentage content of the aromatic monovinyl monomer unit present in the shell portion of the particulate polymer B is 35 mass % or less with the overall particulate polymer B (total amount of core-forming monomer units and shell-forming monomer units) taken to be 100 mass %, the particulate polymer B can be prevented from having a high glass transition temperature Tg, reduction of deformability of an obtained porous membrane during pressing can be prevented, adhesiveness of an obtained porous membrane to a battery component in electrolyte solution can be improved, and heat shrinkage resistance of an obtained porous membrane in electrolyte solution can be improved.

Monomer Units Other than Aromatic Monovinyl Monomer Unit

Examples of monomer units other than the aromatic monovinyl monomer unit that may be included in the shell portion of the particulate polymer B include, but are not specifically limited to, the previously described (meth) acrylic acid alkyl ester monomer unit, acidic group-containing monomer unit, and crosslinkable monomer unit.

The percentage content of monomer units other than the aromatic monovinyl monomer unit in the particulate polymer B is preferably 40 mass % or less from a viewpoint of not impairing the benefits of inclusion of the aromatic monovinyl monomer unit in the shell portion.

Production of Particulate Polymer B

The particulate polymer B is produced by polymerizing a monomer composition containing the nitrile group-containing monomer described above to produce a core portion and continuously thereafter polymerizing a monomer composition containing the aromatic monovinyl monomer described above in the same system to form a shell portion on the surface of the core portion.

The percentage content of each monomer in the monomer compositions is usually the same as the percentage content of the corresponding monomer unit in the desired particulate polymer B.

No specific limitations are placed on the mode of polymerization of the particulate polymer B. For example, any of solution polymerization, suspension polymerization, bulk polymerization, and emulsion polymerization may be used. The polymerization reaction may be, for example, addition polymerization such as ionic polymerization, radical polymerization, or living radical polymerization. Commonly used emulsifiers, dispersants, polymerization initiators, polymerization aids, and the like may be used in the polymerization in an amount that is also the same as commonly used.

Properties of Particulate Polymer B

The particulate polymer B is preferably a random copolymer. The following provides a detailed description of properties of the particulate polymer B including these properties.

Volume-Average Particle Diameter

The volume-average particle diameter of the particulate polymer B is not specifically limited other than being larger than that of the particulate polymer A, but is preferably 300 nm or more, more preferably 350 nm or more, particularly preferably 400 nm or more, and most preferably 450 nm or more, and is preferably 1,000 nm or less, more preferably 800 nm or less, even more preferably 700 nm or less, particularly preferably 600 nm or less, and most preferably 550 nm or less. When the volume-average particle diameter of the particulate polymer B is 300 nm or more, filling of pores in an obtained porous membrane can be prevented, and output characteristics of an obtained secondary battery can be improved. On the other hand, when the volume-average particle diameter of the particulate polymer B is 1,000 nm or less, reduced leveling ability in application of a slurry composition for a porous membrane can be prevented, and output characteristics of an obtained secondary battery can be improved.

The volume average particle diameter of the particulate polymer B can be measured by a measurement method described in the EXAMPLES section. yyc1 Ratio of Volume-Average Particle Diameter of Particulate Polymer A Relative to Volume-Average Particle Diameter of Particulate Polymer B (Volume-Average Particle Diameter of Particulate Polymer A/Volume-Average Particle Diameter of Particulate Polymer B)

A ratio of the volume-average particle diameter of the particulate polymer A relative to the volume-average particle diameter of the particulate polymer B (volume-average particle diameter of particulate polymer A/volume-average particle diameter of particulate polymer B) is required to be less than 1, is preferably 0.1 or more, more preferably 0.25 or more, even more preferably 0.3 or more, and particularly preferably 0.35 or more, and is preferably 0.9 or less, more preferably 0.8 or less, even more preferably 0.66 or less, particularly preferably 0.5 or less, and most preferably 0.45 or less. When the ratio of the volume-average particle diameter of the particulate polymer A relative to the volume-average particle diameter of the particulate polymer B (volume-average particle diameter of particulate polymer A/volume-average particle diameter of particulate polymer B) is less than 1, adhesiveness of an obtained porous membrane in electrolyte solution can be improved, and heat shrinkage resistance of an obtained porous membrane in electrolyte solution can be improved. Moreover, when the ratio of the volume-average particle diameter of the particulate polymer A relative to the volume-average particle diameter of the particulate polymer B (volume-average particle diameter of particulate polymer A/volume-average particle diameter of particulate polymer B) is 0.1 or more, filling of pores in an obtained porous membrane can be prevented, and output characteristics of an obtained secondary battery can be improved.

Production of Binder Composition for Non-Aqueous Secondary Battery Porous Membrane Although no specific limitations are placed on the method by which the binder composition for a porous membrane is produced, in a case in which production of the particulate polymer A and/or the particulate polymer B is carried out in an aqueous medium and in which the particulate polymer A and/or the particulate polymer B is obtained as a water dispersion, the binder composition for a porous membrane may be produced by mixing a water dispersion of the particulate polymer A and a water dispersion of the particulate polymer B, or the binder composition for a porous membrane may be produced by adding other optional components to a mixture of a water dispersion of the particulate polymer A and a water dispersion of the particulate polymer B. These other components may, for example, be other components described in the "Slurry composition for non-aqueous secondary battery porous membrane" section further below.

Ratio of Mass of Particulate Polymer A Relative to Mass of Particulate Polymer B (Mass of Particulate Polymer A/Mass of Particulate Polymer B) in Binder Composition for Non-Aqueous Secondary Battery Porous Membrane A ratio of mass of the particulate polymer A relative to mass of the particulate polymer B (mass of particulate polymer A/mass of particulate polymer B) in the binder composition for a non-aqueous secondary battery porous membrane is preferably 0.01 or more, and more preferably 0.05 or more, and is preferably 0.5 or less, and more preferably 0.25 or less. Adhesiveness of an obtained porous membrane in electrolyte solution can be improved when the ratio of mass of the particulate polymer A relative to mass of the particulate polymer B (mass of particulate polymer A/mass of particulate polymer B) in the binder composition for a non-aqueous secondary battery porous membrane is 0.01 or more, whereas blocking resistance of an obtained porous membrane can be improved when this ratio is 0.5 or less.

Slurry Composition for Non-Aqueous Secondary Battery Porous Membrane

The presently disclosed slurry composition for a non-aqueous secondary battery porous membrane is an aqueous slurry composition that contains particulate polymers A and B originating from the binder composition for a porous membrane set forth above and non-conductive particles dispersed in water serving as a dispersion medium. Besides the components described above, the slurry composition for a porous membrane may optionally contain other components.

Improvement of adhesiveness in electrolyte solution, improvement of heat shrinkage resistance in electrolyte solution, and improvement of blocking resistance are simultaneously achieved with a porous membrane formed using the presently disclosed slurry composition for a porous membrane.

Non-Conductive Particles

The non-conductive particles are particles that have a property of non-conductivity and that maintain their shape without dissolving in water used as the dispersion medium in the slurry composition for a porous membrane and in a non-aqueous electrolyte solution of a secondary battery. The non-conductive particles are electrochemically stable and are, therefore, present stably in a porous membrane in the environment of use of a secondary battery. As a result of the slurry composition for a porous membrane containing the non-conductive particles, a reticulated structure of an obtained porous membrane can be appropriately blocked such that lithium dendrites and the like are prevented from passing through the porous membrane, and short-circuiting between electrodes can be more reliably prevented. Various types of inorganic particles and organic particles can be used as the non-conductive particles.

Examples of inorganic particles that can be used include particles of an oxide such as aluminum oxide (alumina), silicon oxide, magnesium oxide, titanium oxide, $BaTiO_2$, ZrO, or alumina-silica complex oxide; particles of a nitride such as aluminum nitride or boron nitride; particles of covalent crystals such as silicon or diamond; particles of sparingly soluble ionic crystals such as barium sulfate, calcium fluoride, or barium fluoride; and fine particles of a clay such as talc or montmorillonite.

Examples of organic particles that can be used include particles of various crosslinked polymers such as polyethylene, polystyrene, polydivinylbenzene, crosslinked styrene-divinylbenzene copolymer, polyimide, polyamide, polyamide imide, melamine resin, phenolic resin, and benzoguanamine-formaldehyde condensate; and particles of heat resistant polymers such as polysulfone, polyacrylonitrile, polyaramid, polyacetal, and thermoplastic polyimide. The organic particles and the previously described particulate polymers A and B differ in terms that the particulate polymers A and B have binding capacity, whereas the organic particles do not have binding capacity.

Of these examples, inorganic particles are preferable as the non-conductive particles, and aluminum oxide is more preferable as the non-conductive particles from a viewpoint of improving durability of a porous membrane and electrical characteristics of a secondary battery including the porous membrane.

The particle diameter of the non-conductive particles is not specifically limited and can be the same as that of conventionally used non-conductive particles.

Mixing Ratio of Non-Conductive Particles and Binder Composition for Porous Membrane No specific limitations are placed on the mixing ratio of the non-conductive particles and the binder composition for a porous membrane in the slurry composition for a porous membrane. For example, the slurry composition for a porous membrane may contain the binder composition for a porous membrane in an amount such that the total mixed amount of the particulate polymers A and B per 100 parts by mass of the non-conductive particles is preferably 0.1 parts by mass or more, more preferably 1 part by mass or more, and particularly preferably 3 parts by mass or more, and is preferably 25 parts by mass or less, more preferably 20 parts by mass or less, even more preferably 18 parts by mass or less, and particularly preferably 15 parts by mass or less. Close adherence of a porous membrane to a battery component can be ensured and heat shrinkage resistance of the porous membrane in electrolyte solution can be improved when the total mixed amount of the particulate polymers A and B is 0.1 parts by mass or more per 100 parts by mass of the non-conductive particles, whereas electrical characteristics of a secondary battery can be improved when the total mixed amount of the particulate polymers A and B is 25 parts by mass or less per 100 parts by mass of the non-conductive particles.

Other Components

No specific limitations are placed on other components so long as they do not have an excessively negative influence on battery reactions in a secondary battery in which the porous membrane is used. Furthermore, one of such optional components may be used, or two or more of such optional components may be used.

Examples of optional components include wetting agents, leveling agents, electrolyte solution decomposition inhibitors, and water-soluble polymers.

Water-Soluble Polymer

Among the other components mentioned above, the slurry composition for a porous membrane preferably contains a water-soluble polymer. As a result of the slurry composition for a porous membrane, which is an aqueous slurry composition, containing a water-soluble polymer, the slurry composition for a porous membrane can be thickened in order to adjust the viscosity to an appropriate level for easy application. In addition, since a water-soluble polymer has binding capacity and electrolyte solution resistance, the water-soluble polymer can fulfill a role of assisting binding of components in a porous membrane and close adherence with a battery component through the particulate polymers in a secondary battery. Therefore, porous membrane durability can be improved through use of a water-soluble polymer.

When a substance is described as "water-soluble" in the present disclosure, this means that when 0.5 g of the substance is dissolved in 100 g of water at 25° C., insoluble content is less than 1.0 mass %. Also note that in the case of a substance for which the solubility thereof varies depending on the pH of water, the substance is considered to be "water-soluble" so long as there is at least one pH at which the substance satisfies the definition of "water-soluble" set forth above.

Examples of water-soluble polymers that can be used include natural polymers, semi-synthetic polymers, and synthetic polymers.

Natural Polymers

Examples of natural polymers that can be used include polysaccharides and proteins derived from plants or animals, fermentation treated products of these polysaccharides and proteins by microorganisms or the like, and heat treated products of these polysaccharides and proteins.

These natural polymers can be classified as plant-based natural polymers, animal-based natural polymers, microorganism-produced natural polymers, and so forth.

Examples of plant-based natural polymers that can be used include gum arabic, gum tragacanth, galactan, guar gum, carob gum, karaya gum, carrageenan, pectin, kannan, quince seed (marmelo), algal colloid (phaeophyceae extract), starch (derived from rice, corn, potato, wheat, or the like), and glycyrrhizin. Examples of animal-based natural polymers that can be used include collagen, casein, albumin, and gelatin. Examples of microorganism-produced natural polymers that can be used include xanthan gum, dextran, succinoglucan, and pullulan.

Semi-Synthetic Polymers

Examples of semi-synthetic polymers that can be used include cellulosic semi-synthetic polymers. Cellulosic semi-synthetic polymers can be categorized as non-ionic cellulosic semi-synthetic polymers, anionic cellulosic semi-synthetic polymers, and cationic cellulosic semi-synthetic polymers.

Examples of non-ionic cellulosic semi-synthetic polymers that can be used include alkyl celluloses such as methyl cellulose, methyl ethyl cellulose, ethyl cellulose, and microcrystalline cellulose; and hydroxyalkyl celluloses such as hydroxyethyl cellulose, hydroxybutyl methylcellulose, hydroxypropyl cellulose, hydroxypropyl methylcellulose, hydroxyethyl methylcellulose, hydroxypropyl methylcellulose stearoxy ether, carboxymethyl hydroxyethyl cellulose, alkyl hydroxyethyl cellulose, and nonoxynyl hydroxyethyl cellulose.

Examples of anionic cellulosic semi-synthetic polymers that can be used include substitution products obtained by substitution of the non-ionic cellulosic semi-synthetic polymers described above with various derivative groups and salts (sodium salts, ammonium salts, etc.) of these substitution products. Specific examples include sodium cellulose sulfate, methyl cellulose, methyl ethyl cellulose, ethyl cellulose, carboxymethyl cellulose (CMC), and salts thereof.

Examples of cationic cellulosic semi-synthetic polymers that can be used include low nitrogen hydroxyethyl cellulose dimethyl diallylammonium chloride (polyquaternium-4), O-[2-hydroxy-3-(trimethylammonio)propyl]hydroxyethyl cellulose chloride (polyquaternium-10), and O-[2-hydroxy-3-(lauryldimethylammonio)propyl]hydroxyethyl cellulose chloride (polyquaternium-24).

Synthetic Polymers

Examples of synthetic polymers that can be used include salts of polyacrylic acid such as sodium polyacrylate and ammonium acrylate-based polymers, polyvinyl alcohol, polyethylene oxide, polyvinyl pyrrolidone, copolymers of vinyl alcohol and acrylic acid or a salt of acrylic acid, fully or partially saponified copolymers of vinyl acetate and maleic anhydride, maleic acid, or fumaric acid, modified polyvinyl alcohol, modified polyacrylic acid, polyethylene glycol, polycarboxylic acid, ethylene-vinyl alcohol copolymers, vinyl acetate polymers, and acrylamide polymers having an introduced carboxy group and/or cyano group.

Of these water-soluble polymers, carboxymethyl cellulose, salts thereof, and acrylamide polymers having an introduced carboxy group are preferable from a viewpoint of imparting heat resistance to a porous membrane and inhibiting heat shrinkage of an organic separator made of polypropylene or the like. Moreover, acrylamide polymers having an introduced carboxy group are particularly preferable from a viewpoint of improving electrical characteristics of a secondary battery.

The amount of the water-soluble polymer in the slurry composition for a porous membrane per 100 parts by mass of the non-conductive particles is preferably 0.1 parts by mass or more, and more preferably 0.5 parts by mass or more, and is preferably 10 parts by mass or less, and more preferably 5 parts by mass or less. As a result of the amount of the water-soluble polymer being within any of the ranges set forth above, the slurry composition for a porous membrane can be provided with an appropriate level of viscosity, and durability of an obtained porous membrane can be improved.

Production of Slurry Composition for Non-Aqueous Secondary Battery Porous Membrane Although no specific limitations are placed on the method by which the slurry composition for a porous membrane is produced, the slurry composition is normally obtained by mixing the previously described binder composition for a porous membrane, the non-conductive particles, and optional components that are used as necessary. Although no specific limitations are placed on the mixing method, the mixing is performed using a disperser as a mixing apparatus in order to efficiently disperse the components.

The disperser is preferably a device that enables homogeneous dispersion and mixing of the components. Examples of such devices include a ball mill, a sand mill, a pigment disperser, a grinding machine, an ultrasonic disperser, a homogenizer, and a planetary mixer. Of these examples, a high-level dispersing device such as a bead mill, a roll mill, or a FILMIX is particularly preferable since these devices can impart high dispersing shear.

The solid content concentration of the slurry composition for a porous membrane can normally be freely set within a range in which the slurry composition for a porous membrane has a viscosity within a range that does not cause loss of workability during production of a porous membrane. Specifically, the solid content concentration of the slurry composition for a porous membrane can normally be not less than 10 mass % and not more than 50 mass %.

Porous Membrane for Non-Aqueous Secondary Battery

The slurry composition for a secondary battery porous membrane set forth above can, for example, be applied onto the surface of a suitable substrate to form an applied film, and then the applied film that is formed may be dried to form a porous membrane for a non-aqueous secondary battery on the substrate. The porous membrane contains the particulate polymers A and B and the non-conductive particles, and may optionally contain other components. Moreover, improvement of adhesiveness to a battery component in electrolyte solution, improvement of heat shrinkage resistance in electrolyte solution, and improvement of blocking resistance are simultaneously achieved with this porous membrane, and a non-aqueous secondary battery including the porous membrane has excellent battery characteristics.

The substrate onto which the slurry composition for a porous membrane is applied is a component that is a target for formation of an applied film of the slurry composition for a porous membrane. There are no limitations on the substrate. For example, an applied film of the slurry composition for a porous membrane may be formed on the surface of a detachable substrate, the applied film may be dried to form a porous membrane, and the detachable substrate may be peeled from the porous membrane. The porous membrane peeled from the detachable substrate as described above can be used in a secondary battery as a free-standing membrane.

However, from a viewpoint of omitting a step of peeling the porous membrane and improving production efficiency, it is preferable that a battery component is used as the substrate. Specific examples of the aforementioned battery component include a separator and an electrode. A porous membrane provided on a separator or an electrode can be suitably used as a protective layer for improving heat resistance, strength, and so forth of the separator or electrode.

Separator

A known separator such as an organic separator may be used as the separator without any specific limitations. An organic separator is a porous member that is made from an organic material. Examples of organic separators include a microporous membrane or non-woven fabric containing a polyolefin resin such as polyethylene or polypropylene, an aromatic polyamide resin, or the like. A microporous membrane or non-woven fabric made from polyethylene is preferable due to having excellent strength. Although the organic separator may be of any thickness, the thickness of the organic separator is normally 0.5 μm or more, and preferably 5 μm or more, and is normally 40 μm or less, preferably 30 μm or less, and more preferably 20 μm or less.

Electrode

Although no specific limitations are placed on the electrode (positive electrode, negative electrode), the electrode is for example obtained by forming an electrode mixed material layer on a current collector.

The current collector, an electrode active material (positive/negative electrode active material) and an electrode mixed material layer binder (positive/negative electrode mixed material layer binder) in the electrode mixed material layer, and the method by which the electrode mixed material layer is formed on the current collector may be known examples thereof such as those described in JP 2013-145763 A, for example.

Formation Method of Porous Membrane for Non-Aqueous Secondary Battery

Methods that can be used for forming the porous membrane on a battery component such as the separator or the electrode described above include:

(1) a method involving applying the slurry composition for a porous membrane onto the surface of the battery component (surface at an electrode mixed material layer-side in the case of the electrode; same applies below) and subsequently drying the applied slurry composition;

(2) a method involving immersing the battery component in the slurry composition for a porous membrane and subsequently drying the battery component; and (3) a method involving applying the slurry composition for a porous membrane onto a detachable substrate, drying the applied slurry composition to produce a porous membrane, and transferring the obtained porous membrane onto the surface of the battery component.

Of these methods, method (1) is particularly preferable since it allows the thickness of the porous membrane to be easily controlled. In more detail, method (1) includes a step of applying the slurry composition for a porous membrane onto the battery component (application step) and a step of drying the slurry composition for a porous membrane that has been applied onto the battery component to form a porous membrane (porous membrane formation step).

No specific limitations are placed on the method by which the slurry composition for a porous membrane is applied onto the battery component in the application step. For example, a method such as doctor blading, reverse roll coating, direct roll coating, gravure coating, extrusion coating, or brush coating may be used. Of these methods, gravure coating is preferable in terms that a uniform porous membrane is obtained.

The method by which the slurry composition for a porous membrane is dried on the battery component in the porous membrane formation step is not specifically limited and can be a commonly known method. The drying method may, for example, be drying by warm, hot, or low-humidity air; drying in a vacuum; or drying by irradiation with infrared light, an electron beam, or the like. Although no specific limitations are placed on the drying conditions, the drying temperature is preferably 50° C. to 150° C., and the drying time is preferably 5 minutes to 30 minutes.

So long as the effects of the present disclosure are not significantly lost, a positive electrode, a negative electrode, or a separator may include other elements besides the battery component itself and the presently disclosed porous membrane set forth above. For example, another layer may be provided between the battery component and the presently disclosed porous membrane as necessary. In this case, the presently disclosed porous membrane is provided indirectly on the surface of the battery component. Moreover, another layer may be further provided on the surface of the presently disclosed porous membrane.

The thickness of the porous membrane that is formed on the substrate is preferably 0.01 μm or more, more preferably 0.1 μm or more, and particularly preferably 1 μm or more, and is preferably 20 μm or less, more preferably 10 μm or less, and particularly preferably 5 μm or less. Sufficient porous membrane strength can be ensured through the thickness of the porous membrane being 0.01 μm or more, whereas diffusivity of electrolyte solution can be ensured and output characteristics of a secondary battery including the porous membrane can be improved through the thickness of the porous membrane being 20 μm or less.

Non-Aqueous Secondary Battery

The presently disclosed non-aqueous secondary battery includes a positive electrode, a negative electrode, a separator, and an electrolyte solution, wherein at least one battery component selected from the group consisting of the positive electrode, the negative electrode, and the separator includes the porous membrane for a non-aqueous secondary battery set forth above (for example, on the surface of the battery component).

The presently disclosed non-aqueous secondary battery has high performance as a result of including a porous membrane obtained using the presently disclosed slurry composition for a porous membrane.

Positive Electrode, Negative Electrode, Separator, and Porous Membrane

The positive electrode, the negative electrode, the separator, and the porous membrane may be the same as any of the examples given in the "Porous membrane for non-aqueous secondary battery" section, and any of the techniques described in that section may be adopted as the method by which the porous membrane is formed on the surface of the positive electrode, negative electrode, and/or separator.

Electrolyte Solution

The electrolyte solution is normally an organic electrolyte solution obtained by dissolving a supporting electrolyte in an organic solvent. The supporting electrolyte may, for example, be a lithium salt in the case of a lithium ion secondary battery. Examples of lithium salts that can be used include $LiPF_6$, $LiAsF_6$, $LiBF_4$, $LiSbF_6$, $LiAlCl_4$, $LiClO_4$, $CF_3SO_3Li$, $C_4F_9SO_3Li$, $CF_3COOLi$, $(CF_3CO)_2NLi$, $(CF_3SO_2)_2NLi$, and $(C_2F_5SO_2)NLi$. Of these lithium salts, $LiPF_6$, $LiClO_4$, and $CF_3SO_3Li$ are preferable as they readily dissolve in solvents and exhibit a high degree of dissociation. One electrolyte may be used individually, or two or more electrolytes may be used in combination. In general, lithium ion conductivity tends to increase when a supporting electrolyte having a high degree of dissociation is used. Therefore, lithium ion conductivity can be adjusted through the type of supporting electrolyte that is used.

No specific limitations are placed on the organic solvent used in the electrolyte solution other than being an organic solvent in which the supporting electrolyte can dissolve. Examples of suitable organic solvents in the case of a lithium ion secondary battery include carbonates such as dimethyl carbonate (DMC), ethylene carbonate (EC), diethyl carbonate (DEC), propylene carbonate (PC), butylene carbonate (BC), and methyl ethyl carbonate (MEC); esters such as γ-butyrolactone and methyl formate; ethers such as 1,2-dimethoxyethane and tetrahydrofuran; and sulfur-containing compounds such as sulfolane and dimethyl sulfoxide. Furthermore, a mixture of such solvents may be used. Of these solvents, carbonates are preferable due to having a high permittivity and a wide stable potential region. In general, lithium ion conductivity tends to increase when a solvent having a low viscosity is used. Therefore, lithium ion conductivity can be adjusted through the type of solvent that is used.

The concentration of the electrolyte in the electrolyte solution may be adjusted as appropriate. Furthermore, known additives may be added to the electrolyte solution.

The non-aqueous secondary battery can be produced by, for example, stacking the positive electrode and the negative electrode with the separator in-between, performing rolling, folding, or the like of the resultant stack as necessary to place the stack in a battery container, injecting the electrolyte solution into the battery container, and sealing the battery container. At least one component among the positive electrode, the negative electrode, and the separator is a porous membrane-equipped component. In order to prevent pressure increase inside the battery and occurrence of overcharging or overdischarging, an expanded metal; an overcurrent preventing device such as a fuse or a PTC device; or a lead plate may be provided in the battery container as necessary. The shape of the battery may be a coin type, button type, sheet type, cylinder type, prismatic type, flat type, or the like.

Non-Aqueous Secondary Battery Production Method

The presently disclosed non-aqueous secondary battery production method is a method for producing the presently disclosed non-aqueous secondary battery and includes a step of adhering the separator and at least one of the positive electrode and the negative electrode via the porous membrane for a non-aqueous secondary battery.

Adhering Step

The adhering step preferably includes either or both of pressing and heating a battery component roll (laminate) in which the separator and at least one of the positive electrode and the negative electrode are wound (stacked) via the porous membrane for a non-aqueous secondary battery.

In other words, it is preferable that the separator and at least one of the positive electrode and the negative electrode are adhered via the porous membrane for a non-aqueous secondary battery set forth above in the adhering step. Accordingly, in the adhering step, just the positive electrode and the separator may be adhered via a porous membrane such as described above, just the negative electrode and the separator may be adhered via a porous membrane such as described above, or the positive electrode and the separator may be adhered via a porous membrane such as described above and also the negative electrode and the separator may be adhered via a porous membrane such as described above. Of these examples, it is preferable that the positive electrode and the separator are adhered via a porous membrane such as described above and that the negative electrode and the separator are also adhered via a porous membrane such as described above in the adhering step.

Adhesion Method

Although the adhering may be carried out just by obtaining each battery component roll (laminate) described above, it is preferable that the obtained battery component laminate is pressed and/or heated, more preferable that the battery component roll (laminate) is at least pressed, and even more preferable that the battery component roll (laminate) is pressed and heated. Pressing and heating may be performed simultaneously, heating may be performed after pressing, or pressing may be performed after heating. However, it is preferable that pressing and heating are performed simultaneously from a viewpoint of operational efficiency and because better adhesion between battery components can be achieved.

Pressing Method

In a case in which pressing is performed in the adhering step, the battery component roll (laminate) can, for example, be pressed using a known pressing machine such as a flat-plate press or a roll press.

The pressing pressure is preferably 0.5 MPa or more, and is preferably 10 MPa or less. Moreover, the pressing time is preferably 1 second or more, and is preferably 10 minutes or less.

Heating Method

In a case in which heating is performed in the adhering step, the battery component roll (laminate) may, for example, be placed in an environment having a certain temperature using a known heater or a pressing plate of the aforementioned pressing machine may be heated to a certain temperature.

The heating temperature is preferably 40° C. or higher, and is preferably 150° C. or lower.

EXAMPLES

The following provides a more specific description of the present disclosure based on examples. However, the present disclosure is not limited to the following examples. In the following description, "%" and "parts" used in expressing quantities are by mass, unless otherwise specified.

In the examples and comparative examples, the volume-average particle diameter D50 of particulate polymers A and B and the glass-transition temperature Tg of a particulate polymer A were measured by the following methods. Moreover, the heat shrinkage resistance of a porous membrane, the adhesiveness of a porous membrane after immersion in electrolyte solution, the blocking resistance of a porous membrane, and the output characteristics of a secondary battery were evaluated by the following methods.

Volume-Average Particle Diameter D50 of Particulate Polymers A and B

The volume-average particle diameter D50 of particulate polymers A and B was measured by diluting a water dispersion containing the particulate polymer A or B to prepare a measurement sample having a solid content concentration of 2%, and then using a laser diffraction/light scattering particle size distribution measurement apparatus (LS230 produced by Beckman Coulter Inc.) to perform the measurement. The measurement results are shown in Tables 1 and 1-2.

Glass-Transition Temperature Tg of Particulate Polymer A

A water dispersion containing a particulate polymer A was dried for 3 days in an environment of 50% humidity and 23° C. to 25° C. to obtain a film having a thickness of 1±0.3 mm. This film was dried for 1 hour in a hot air oven at 120° C. The dried film was subsequently used as a sample in order to measure the glass-transition temperature Tg (° C.) of the particulate polymer A, in accordance with JIS K7121, with a measurement temperature of −100° C. to 180° C. and a heating rate of 5° C./min, and using a differential scanning calorimeter (DSC6220 produced by SII Nanotechnology). The measurement results are shown in Tables 1 and 1-2.

Heat Shrinkage Resistance of Porous Membrane after Immersion in Electrolyte Solution (Examples and Comparative Examples Other than Example 13: Heat Shrinkage Resistance of Porous Membrane-Equipped, Single-Sided Separator)

A produced negative electrode was cut out as a 10 cm×10 cm square and a produced porous membrane-equipped, single-sided separator was cut out as a 12 cm×12 cm square. A test specimen was positioned such that the surface at the negative electrode mixed material layer-side of the negative electrode and the porous membrane of the porous membrane-equipped, single-sided separator faced one another and was placed in laminate packing with approximately 800 μL of electrolyte solution.

The electrolyte solution was a solution containing 1 mol/L in concentration of $LiPF_6$ dissolved as a supporting electrolyte in a mixed solvent of EC, DEC, and vinylene carbonate (VC) (EC/DEC/VC (volume mixing ratio at 25° C.)=68.5/30/1.5).

An aluminum packing case was closed by heat sealing at 150° C. so as to tightly seal an opening of the aluminum packing case.

After 12 hours, the test specimen sealed in the aluminum packing case was pressed, together with the aluminum packing case, for 4 minutes at a temperature of 80° C. and a pressure of 1 MPa.

The test specimen was then placed in a 130° C. thermostatic tank, together with the aluminum packing case, and was left for 1 hour. The test specimen was subsequently removed from the aluminum packing and the shrunk area of the porous membrane-equipped, single-sided separator was confirmed.

An evaluation was made by the following standard. A smaller value for heat shrinkage indicates that heat shrinkage resistance of the porous membrane in electrolyte solution is higher and that the porous membrane-equipped, single-sided separator has excellent heat shrinkage resistance in electrolyte solution.

A: Heat shrinkage of less than 2%
B: Heat shrinkage of not less than 2% and less than 5%
C: Heat shrinkage of 5% or more Heat Shrinkage Resistance of Porous Membrane after Immersion in Electrolyte Solution (Example 13: Heat Shrinkage Resistance of Porous Membrane of Porous Membrane-Equipped Negative Electrode A produced porous membrane-equipped negative electrode was cut out as a 10 cm×10 cm square and a produced separator was cut out as a 12 cm×12 cm square.

A test specimen was positioned such that the surface at the porous membrane-side of the negative electrode and the separator faced one another and was placed in laminate packing with approximately 800 μL of electrolyte solution.

The electrolyte solution was a solution containing 1 mol/L in concentration of $LiPF_6$ dissolved as a supporting electrolyte in a mixed solvent of EC, DEC, and vinylene carbonate (VC) (EC/DEC/VC (volume mixing ratio at 25° C.)=68.5/30/1.5).

An aluminum packing case was closed by heat sealing at 150° C. so as to tightly seal an opening of the aluminum packing case.

After 12 hours, the test specimen sealed in the aluminum packing case was pressed, together with the aluminum packing case, for 4 minutes at a temperature of 80° C. and a pressure of 1 MPa.

The test specimen was then placed in a 130° C. thermostatic tank, together with the aluminum packing case, and was left for 1 hour. The test specimen was subsequently removed from the aluminum packing and the shrunk area of the porous membrane was confirmed.

An evaluation was made by the following standard. A smaller value for heat shrinkage indicates that the porous membrane has excellent heat shrinkage resistance in electrolyte solution.

A: Heat shrinkage of less than 2%
B: Heat shrinkage of not less than 2% and less than 5%
C: Heat shrinkage of 5% or more Adhesiveness of Porous Membrane after Immersion in Electrolyte Solution (Examples and Comparative Examples Other than Example 13: Adhesiveness of Negative Electrode and Porous Membrane-Equipped, Single-Sided Separator)

A produced negative electrode and a produced porous membrane-equipped, single-sided separator were each cut out as a 10 mm×100 mm strip. The negative electrode mixed material layer of the negative electrode was positioned along the surface of the porous membrane of the porous membrane-equipped, single-sided separator. Heated pressing was then performed for 6 minutes at a temperature of 85° C. and a pressure of 0.5 MPa to prepare a laminate including the negative electrode and the porous membrane-equipped, single-sided separator. This laminate was used as a test specimen.

The test specimen was placed in laminate packing with approximately 400 μL of electrolyte solution. After 1 hour, the test specimen was pressed, together with the laminate packing, for 15 minutes at 60° C. and a pressure of 0.5 MPa. The test specimen was held at a temperature of 60° C. for 1 day after the pressing. The electrolyte solution was a solution containing 1 mol/L in concentration of $LiPF_6$ dissolved as a supporting electrolyte in a mixed solvent of EC, DEC, and vinylene carbonate (VC) (EC/DEC/VC (volume mixing ratio at 25° C.)=68.5/30/1.5).

The test specimen was then taken out, and electrolyte solution on the surface of the test specimen was wiped off. Next, the test specimen was placed with the surface at the current collector-side of the negative electrode facing downward, and cellophane tape was attached to the surface at the current collector-side of the negative electrode. Tape prescribed by JIS Z1522 was used as the cellophane tape. The cellophane tape had been affixed to a horizontal test stage beforehand. One end of the porous membrane-equipped, single-sided separator was pulled vertically upward at a pulling speed of 50 mm/min and the stress when the porous membrane-equipped, single-sided separator was peeled off was measured. This measurement was made 3 times. An average value for the stress was determined as the peel strength P2 and was evaluated by the following standard. The evaluation results are shown in Tables 1 and 1-2. A larger peel strength P2 indicates that adhesiveness of the porous membrane in electrolyte solution is excellent and that the porous membrane-equipped, single-sided separator and the electrode (negative electrode) are strongly adhered.

A: Peel strength P2 of 1.5 N/m or more
B: Peel strength P2 of not less than 1.0 N/m and less than 1.5 N/m
C: Peel strength P2 of not less than 0.5 N/m and less than 1.0 N/m
D: Peel strength P2 of less than 0.5 N/m Adhesiveness of Porous Membrane after Immersion in Electrolyte Solution (Example 13: Adhesiveness of Porous Membrane-Equipped Negative Electrode and Separator A produced porous membrane-equipped negative electrode and a produced separator were each cut out as a 10 mm×100 mm strip. The separator was positioned along the surface of the porous membrane of the porous membrane-equipped negative electrode. Heated pressing was then performed for 6 minutes at a temperature of 85° C. and a pressure of 0.5 MPa to prepare a laminate including the porous membrane-equipped negative electrode and the separator. This laminate was used as a test specimen.

The test specimen was placed in laminate packing with approximately 400 µL of electrolyte solution. After 1 hour, the test specimen was pressed, together with the laminate packing, for 15 minutes at 60° C. and a pressure of 0.5 MPa. The test specimen was held at a temperature of 60° C. for 1 day after the pressing. The electrolyte solution was a solution containing 1 mol/L in concentration of $LiPF_6$ dissolved as a supporting electrolyte in a mixed solvent of EC, DEC, and vinylene carbonate (VC) (EC/DEC/VC (volume mixing ratio at 25° C.)=68.5/30/1.5).

The test specimen was then taken out, and electrolyte solution on the surface of the test specimen was wiped off. Next, the test specimen was placed with the surface at the current collector-side of the negative electrode facing downward, and cellophane tape was attached to the surface at the current collector-side of the negative electrode. Tape prescribed by JIS Z1522 was used as the cellophane tape. The cellophane tape had been affixed to a horizontal test stage beforehand. One end of the separator was pulled vertically upward at a pulling speed of 50 mm/min and the stress when the separator was peeled off was measured. This measurement was made 3 times. An average value for the stress was determined as the peel strength P2 and was evaluated by the following standard. The evaluation results are shown in Table 1. A larger peel strength P2 indicates that adhesiveness of the porous membrane in electrolyte solution is excellent and that the porous membrane-equipped negative electrode and the separator are strongly adhered.

A: Peel strength P2 of 1.5 N/m or more
B: Peel strength P2 of not less than 1.0 N/m and less than 1.5 N/m
C: Peel strength P2 of not less than 0.5 N/m and less than 1.0 N/m
D: Peel strength P2 of less than 0.5 N/m Blocking Resistance of Porous Membrane A porous membrane-equipped, double-sided separator produced through formation of a porous membrane for a non-aqueous secondary battery in each example or comparative example was cut out as a square of 5 cm in width by 5 cm in length for use as a test specimen. A sample was prepared by overlapping two of such test specimens (non-pressed sample) and a sample was prepared by overlapping two of such test specimens and then placing the test specimens under pressing at 40° C. and 10 g/cm² (pressed sample). The samples were each left for 24 hours. After each of the samples had been left for 24 hours, the adhesion state (blocking state) of the overlapped porous membrane-equipped, double-sided separators was confirmed by eye and was evaluated by the following standard. The evaluation results are shown in Tables 1 and 1-2.

A: Blocking of separators does not occur in pressed sample
B: Blocking of separators occurs in pressed sample but separators can be peeled apart
C: Blocking of separators occurs in pressed sample and separators cannot be peeled apart
D: Blocking of separators occurs in non-pressed sample Output Characteristics of Secondary Battery A produced secondary battery was left for 24 hours in a 25° C. environment, and was subsequently subjected to a charge/discharge operation of charging to 4.35 V at 0.1 C and discharging to 2.75 V at 0.1 C in a 25° C. environment. The initial capacity C0 was measured. Thereafter, the secondary battery was subjected to a charge/discharge operation of charging to 4.35 V at 0.1 C and discharging to 2.75 V at 2 C in a 25° C. environment, and the capacity C1 was measured. $\Delta C=\{(C0-C1)/C0\}\times100(\%)$ was calculated and was evaluated by the following standard. The evaluation results are shown in Table 1. A larger $\Delta C$ indicates excellent output characteristics.

A: $\Delta C$ of 80% or more
B: $\Delta C$ of not less than 75% and less than 80%
C: $\Delta C$ of not less than 60% and less than 75%
D: $\Delta C$ of less than 60%

Example 1

Production of Particulate Polymer A (Binder)

A reactor including a stirrer was supplied with 70 parts of deionized water, 0.15 parts of polyoxyethylene lauryl ether (EMULGEN® 120 (EMULGEN is a registered trademark in Japan, other countries, or both) produced by Kao Corporation) as an emulsifier, and 0.5 parts of ammonium persulfate. The gas phase of the reactor was purged with nitrogen gas and the temperature was raised to 60° C.

A monomer composition was obtained in a separate vessel by mixing 50 parts of deionized water, 0.5 parts of polyoxyethylene lauryl ether (EMULGEN® 120 produced by Kao Corporation) as an emulsifier, 68 parts of 2-ethylhexyl acrylate (2-EHA) as a (meth)acrylic acid alkyl ester monomer having an alkyl group carbon number of 8, 27 parts of styrene (ST) as an aromatic monovinyl monomer, 1.7 parts of allyl glycidyl ether (AGE; hydrophilic crosslinking agent) as a crosslinkable monomer, 0.3 parts of allyl methacrylate (AMA; hydrophobic crosslinking agent) as a crosslinkable monomer, and 3 parts of acrylic acid (AA) as an acidic group-containing monomer. The monomer composition was continuously added to the reactor A over 4 hours to carry out polymerization. The reaction was carried out at 70° C. during the addition. After the addition was complete, stirring was performed for a further 3 hours at 80° C. to complete the reaction and produce a water dispersion containing a particulate polymer A (binder for a non-aqueous secondary battery porous membrane).

In measurement of the glass-transition temperature Tg of the obtained particulate polymer A, only one glass-transition temperature Tg (−20° C.) was observed and it was confirmed that the particulate polymer was a random copolymer. The obtained particulate polymer A had a volume-average particle diameter D50 of 200 nm.

Production of Particulate Polymer B (Adhesive Particles)

A reactor including a stirrer was supplied with 100 parts of deionized water and 0.5 parts of ammonium persulfate. The gas phase of the reactor was purged with nitrogen gas and the temperature was raised to 60° C. A core portion monomer mixture was obtained in a separate vessel by mixing 50 parts of deionized water, 0.3 parts of sodium dodecylbenzenesulfonate as an emulsifier, 24.6 parts of butyl acrylate (BA) as a (meth)acrylic acid alkyl ester monomer, 14 parts of methyl methacrylate (MMA) as a (meth)acrylic acid alkyl ester monomer, 30 parts of acrylonitrile (AN) as a nitrile group-containing monomer, 0.7 parts of methacrylic acid (MAA) as an acidic group-containing monomer, and 0.7 parts of ethylene dimethacrylate (EDMA) as a crosslinkable group-containing monomer. The monomer mixture was continuously added to the reactor over 4 hours to carry out polymerization at 60° C. Polymerization was continued until a polymerization conversion rate of 96% was reached to yield a water dispersion containing a particulate polymer forming a core portion. The water dispersion was then heated to 80° C. Polymerization was continued while continuously supplying 30 parts of styrene (ST) as a shell portion monomer into the water dispersion over 30 minutes. Once the polymerization conversion rate reached 96%, the reaction was terminated by cooling to yield a water dispersion containing a particulate polymer B.

The obtained particulate polymer B had a volume-average particle diameter D50 of 500 nm.

Production of Slurry Composition for Non-Aqueous Secondary Battery Porous Membrane A ball mill was used to mix 80 parts in terms of solid content of alumina (produced by Sumitomo Chemical Co., Ltd.; product name: AKP3000; volume-average particle diameter d0: 0.5 µm) as inorganic particles, 5 parts in terms of solid content of the particulate polymer A and 20 parts in terms of solid content of the particulate polymer B obtained by the methods described above, 0.8 parts of an ammonium acrylate-based polymer (ARON A-6114 produced by Toagosei Co., Ltd.) as a water-soluble polymer (dispersant), and deionized water in an amount such that solid content concentration in a reaction medium was 15%. In this manner, a slurry composition for a porous membrane containing a binder composition for a porous membrane was produced.

Production of Porous Membrane-Equipped, Double-Sided Separator

An organic separator substrate (produced by Celgard, LLC.; thickness: 16 µm) that was formed by a porous substrate made from polyethylene was prepared. The slurry composition for a porous membrane produced by the method described above was applied onto both sides of the organic separator substrate that had been prepared such as to have a thickness of 1 µm at each side and was dried for 10 minutes at 60° C. In this manner, a porous membrane-equipped, double-sided separator of 18 µm in thickness that included porous membranes was obtained. The obtained porous membrane-equipped, double-sided separator was used to evaluate porous membrane blocking resistance.

Production of Porous Membrane-Equipped, Single-Sided Separator

An organic separator substrate (produced by Celgard, LLC.; thickness: 16 µm) that was formed by a porous substrate made from polyethylene was prepared. The slurry composition for a porous membrane produced by the method described above was applied onto one side of the organic separator substrate that had been prepared such as to have a thickness of 1 µm and was dried for 10 minutes at 60° C. In this manner, a porous membrane-equipped, single-sided separator of 17 µm in thickness that included a porous membrane was obtained.

The obtained porous membrane-equipped, single-sided separator was used to evaluate porous membrane heat shrinkage resistance after immersion in electrolyte solution and porous membrane adhesiveness after immersion in electrolyte solution.

Production of Positive Electrode for Non-Aqueous Secondary Battery

A slurry composition for a positive electrode was produced by combining 96 parts of $LiCoO_2$ (volume-average particle diameter D50: 12 µm) as a positive electrode active material, 2 parts of acetylene black (HS-100 produced by Denki Kagaku Kogyo Kabushiki Kaisha) as a conductive material, 2 parts in terms of solid content of polyvinylidene fluoride (#7208 produced by Kureha Corporation) as a binder for a positive electrode mixed material layer, and N-methylpyrrolidone as a solvent such that the total solid content concentration was 70%, and mixing these materials using a planetary mixer.

A comma coater was used to apply the slurry composition for a positive electrode, obtained as described above, onto aluminum foil (current collector) of 20 µm in thickness such as to have a thickness of approximately 150 µm after drying. The applied slurry composition was dried by conveying the aluminum foil inside a 60° C. oven for 2 minutes at a speed of 0.5 m/min. Thereafter, heat treatment was performed for 2 minutes at 120° C. to obtain a positive electrode web. The pre-pressing positive electrode web was rolled by roll pressing to obtain a post-pressing positive electrode including a positive electrode mixed material layer of 80 µm in thickness.

Production of Negative Electrode for Non-Aqueous Secondary Battery

A 5 MPa pressure vessel equipped with a stirrer was charged with 33 parts of 1,3-butadiene, 3.5 parts of itaconic acid, 63.5 parts of styrene, 0.4 parts of sodium dodecylbenzenesulfonate as an emulsifier, 150 parts of deionized water, and 0.5 parts of potassium persulfate as a polymerization initiator. The contents of the pressure vessel were sufficiently stirred and were then heated to 50° C. to initiate polymerization. The reaction was terminated by cooling at the point at which the polymerization conversion rate reached 96% to yield a mixture containing a particulate binder (SBR) for a negative electrode mixed material layer. The mixture containing the particulate binder was adjusted to pH 8 through addition of 5% sodium hydroxide aqueous solution, and then unreacted monomer was removed by thermal-vacuum distillation. Thereafter, the mixture was cooled to 30° C. or lower to obtain a water dispersion containing the target particulate binder.

Next, 100 parts of artificial graphite (volume-average particle diameter D50: 15.6 µm) as a negative electrode active material, 1 part in terms of solid content of a 2% aqueous solution of a sodium salt of carboxymethyl cellulose (MAC350HC produced by Nippon Paper Industries Co., Ltd.) as a water-soluble polymer (thickener), and deionized water were mixed and adjusted to a solid content concentration of 68%, and then these materials were mixed for 60 minutes at 25° C. Deionized water was then used to adjust the solid content concentration to 62%, and further mixing was performed for 15 minutes at 25° C. Thereafter, 1.5 parts in terms of solid content of the water dispersion containing the previously described particulate binder and deionized water were added to the resultant mixture, the final solid content concentration was adjusted to 52%, and a further 10 minutes of mixing was performed. The resultant mixture was subjected to a defoaming process under reduced pressure to yield a slurry composition for a negative electrode having good fluidity.

A comma coater was used to apply the slurry composition for a negative electrode, obtained as described above, onto copper foil (current collector) of 20 μm in thickness such as to have a thickness of approximately 150 μm after drying. The applied slurry composition was dried by conveying the copper foil inside a 60° C. oven for 2 minutes at a speed of 0.5 m/min. Thereafter, heat treatment was performed for 2 minutes at 120° C. to obtain a pre-pressing negative electrode web. The pre-pressing negative electrode web was rolled by roll pressing to obtain a post-pressing negative electrode including a negative electrode mixed material layer of 80 μm in thickness.

Production of Non-Aqueous Secondary Battery

The positive electrode obtained as described above was cut out as 49 cm×5 cm and was then placed with the surface at the positive electrode mixed material layer-side thereof as an upper side. A separator for a non-aqueous secondary battery (porous membrane-equipped, double-sided separator) that had been cut out as 120 cm×5.5 cm was placed on the positive electrode such that the surface at the positive electrode mixed material layer-side of the positive electrode and one of the porous membranes of the porous membrane-equipped, double-sided separator faced one another and such that the positive electrode was positioned at a longitudinal direction left-hand side of the porous membrane-equipped, double-sided separator. In addition, the post-pressing negative electrode obtained as described above was cut out as 50 cm×5.2 cm and was placed on the porous membrane-equipped, double-sided separator such that the surface at the negative electrode mixed material layer-side of the negative electrode and the other porous membrane of the porous membrane-equipped, double-sided separator faced one another and such that the negative electrode was positioned at a longitudinal direction right-hand side of the separator. The resultant product was then wound by a winding machine with the longitudinal direction middle of the porous membrane-equipped, double-sided separator at the center so as to obtain a roll (laminate). This roll was pressed into a flat form at 60° C. and 0.5 MPa and was then enclosed in an aluminum packing case serving as a battery case. Electrolyte solution (solvent: EC/DEC/VC (volume mixing ratio)=68.5/30/1.5; electrolyte: $LiPF_6$ of 1 M in concentration) was injected such that no air remained. In addition, the aluminum packing case was closed by heat sealing at 150° C. so as to tightly seal an opening of the aluminum packing case. Thereafter, the roll that had been sealed in the aluminum packing case was pressed, together with the aluminum packing case, for 4 minutes at a temperature of 80° C. and a pressure of 1 MPa, and thus a wound lithium ion secondary battery having a discharge capacity of 1,000 mAh was produced as a non-aqueous secondary battery.

Output characteristics of the obtained secondary battery were evaluated. The results are shown in Table 1.

Example 2

Particulate polymers A and B, a slurry composition for a porous membrane, porous membrane-equipped (double-sided and single-sided) separators, a positive electrode for a non-aqueous secondary battery, a negative electrode for a non-aqueous secondary battery, and a non-aqueous secondary battery were produced in the same way as in Example 1 with the exception that in production of the particulate polymer B in Example 1, 45 parts of acrylonitrile (AN) and 23.6 parts of butyl acrylate (BA) were used instead of 30 parts of acrylonitrile (AN), 24.6 parts of butyl acrylate (BA), and 14 parts of methyl methacrylate (MMA) (i.e., methyl methacrylate (MMA) was not used). The same evaluations as in Example 1 were also carried out. The results are shown in Table 1.

Example 3

Particulate polymers A and B, a slurry composition for a porous membrane, porous membrane-equipped (double-sided and single-sided) separators, a positive electrode for a non-aqueous secondary battery, a negative electrode for a non-aqueous secondary battery, and a non-aqueous secondary battery were produced in the same way as in Example 1 with the exception that in production of the particulate polymer A in Example 1, 80 parts of 2-ethylhexyl acrylate (2-EHA) and 15 parts of styrene (ST) were used instead of 68 parts of 2-ethylhexyl acrylate (2-EHA) and 27 parts of styrene (ST). The same evaluations as in Example 1 were also carried out. The results are shown in Table 1.

Example 4

Particulate polymers A and B, a slurry composition for a porous membrane, porous membrane-equipped (double-sided and single-sided) separators, a positive electrode for a non-aqueous secondary battery, a negative electrode for a non-aqueous secondary battery, and a non-aqueous secondary battery were produced in the same way as in Example 1 with the exception that in production of the particulate polymer A in Example 1, 55 parts of 2-ethylhexyl acrylate (2-EHA) and 40 parts of styrene (ST) were used instead of 68 parts of 2-ethylhexyl acrylate (2-EHA) and 27 parts of styrene (ST). The same evaluations as in Example 1 were also carried out. The results are shown in Table 1.

Example 5

Particulate polymers A and B, a slurry composition for a porous membrane, porous membrane-equipped (double-sided and single-sided) separators, a positive electrode for a non-aqueous secondary battery, a negative electrode for a non-aqueous secondary battery, and a non-aqueous secondary battery were produced in the same way as in Example 1 with the exception that in production of the particulate polymer A in Example 1, lauryl acrylate was used instead of 2-ethylhexyl acrylate (2-EHA). The same evaluations as in Example 1 were also carried out. The results are shown in Table 1.

Example 6

Particulate polymers A and B, a slurry composition for a porous membrane, porous membrane-equipped (double-sided and single-sided) separators, a positive electrode for a non-aqueous secondary battery, a negative electrode for a non-aqueous secondary battery, and a non-aqueous secondary battery were produced in the same way as in Example 1 with the exception that instead of supplying 0.15 parts of polyoxyethylene lauryl ether as an emulsifier into a reactor including a stirrer, and producing and using a particulate polymer B having a volume-average particle diameter D50 of 500 nm in Example 1, 0.25 parts of polyoxyethylene lauryl ether as an emulsifier was supplied into a reactor including a stirrer, and a particulate polymer B having a volume-average particle diameter D50 of 300 nm was produced and used. The same evaluations as in Example 1 were also carried out. The results are shown in Table 1.

Example 7

Particulate polymers A and B, a slurry composition for a porous membrane, porous membrane-equipped (double-sided and single-sided) separators, a positive electrode for a non-aqueous secondary battery, a negative electrode for a non-aqueous secondary battery, and a non-aqueous secondary battery were produced in the same way as in Example 1 with the exception that instead of supplying 0.15 parts of polyoxyethylene lauryl ether as an emulsifier into a reactor including a stirrer, and producing and using a particulate polymer B having a volume-average particle diameter D50 of 500 nm in Example 1, polyoxyethylene lauryl ether was not supplied as an emulsifier into a reactor including a stirrer, and a particulate polymer B having a volume-average particle diameter D50 of 800 nm was produced and used. The same evaluations as in Example 1 were also carried out. The results are shown in Table 1.

Example 8

Particulate polymers A and B, a slurry composition for a porous membrane, porous membrane-equipped (double-sided and single-sided) separators, a positive electrode for a non-aqueous secondary battery, a negative electrode for a non-aqueous secondary battery, and a non-aqueous secondary battery were produced in the same way as in Example 6 with the exception that instead of supplying 0.25 parts of polyoxyethylene lauryl ether as an emulsifier into a reactor including a stirrer, and producing and using a particulate polymer A having a volume-average particle diameter D50 of 200 nm in Example 6, 0.22 parts of polyoxyethylene lauryl ether as an emulsifier was supplied into a reactor including a stirrer, and a particulate polymer A having a volume-average particle diameter D50 of 240 nm was produced and used. The same evaluations as in Example 6 were also carried out. The results are shown in Table 1.

Example 9

Particulate polymers A and B, a slurry composition for a porous membrane, porous membrane-equipped (double-sided and single-sided) separators, a positive electrode for a non-aqueous secondary battery, a negative electrode for a non-aqueous secondary battery, and a non-aqueous secondary battery were produced in the same way as in Example 1 with the exception that in production of the particulate polymer B in Example 1, 46 parts of acrylonitrile (AN), 9.6 parts of butyl acrylate (BA), and 13 parts of methyl methacrylate (MMA) were used instead of 30 parts of acrylonitrile (AN), 24.6 parts of butyl acrylate (BA), and 14 parts of methyl methacrylate (MMA). The same evaluations as in Example 1 were also carried out. The results are shown in Table 1.

Example 10

Particulate polymers A and B, a slurry composition for a porous membrane, porous membrane-equipped (double-sided and single-sided) separators, a positive electrode for a non-aqueous secondary battery, a negative electrode for a non-aqueous secondary battery, and a non-aqueous secondary battery were produced in the same way as in Example 1 with the exception that in production of the particulate polymer B in Example 1, 22 parts of acrylonitrile (AN) and 32.6 parts of butyl acrylate (BA) were used instead of 30 parts of acrylonitrile (AN) and 24.6 parts of butyl acrylate (BA). The same evaluations as in Example 1 were also carried out. The results are shown in Table 1.

Example 11

Particulate polymers A and B, a slurry composition for a porous membrane, porous membrane-equipped (double-sided and single-sided) separators, a positive electrode for a non-aqueous secondary battery, a negative electrode for a non-aqueous secondary battery, and a non-aqueous secondary battery were produced in the same way as in Example 1 with the exception that in production of the particulate polymer B in Example 1, 25.7 parts of acrylonitrile (AN), 26.6 parts of butyl acrylate (BA), and 3 parts of methacrylic acid (MAA) were used instead of 30 parts of acrylonitrile (AN), 24.6 parts of butyl acrylate (BA), and 0.7 parts of methacrylic acid (MAA). The same evaluations as in Example 1 were also carried out. The results are shown in Table 1.

Example 12

Particulate polymers A and B, a slurry composition for a porous membrane, porous membrane-equipped (double-sided and single-sided) separators, a positive electrode for a non-aqueous secondary battery, a negative electrode for a non-aqueous secondary battery, and a non-aqueous secondary battery were produced in the same way as in Example 1 with the exception that in production of the particulate polymer B in Example 1, 28.6 parts of acrylonitrile (AN), 26.6 parts of butyl acrylate (BA), and 0.1 parts of methacrylic acid (MAA) were used instead of 30 parts of acrylonitrile (AN), 24.6 parts of butyl acrylate (BA), and 0.7 parts of methacrylic acid (MAA). The same evaluations as in Example 1 were also carried out. The results are shown in Table 1.

Example 13

The methods described below were used to form a porous membrane-equipped positive electrode for a non-aqueous secondary battery instead of a positive electrode for a non-aqueous secondary battery and to form a porous membrane-equipped negative electrode for a non-aqueous secondary battery instead of a negative electrode for a non-aqueous secondary battery. Moreover, in production of a non-aqueous secondary battery, the non-aqueous secondary battery was produced by the method described below by using a separator instead of a porous membrane-equipped, double-sided separator, a porous membrane-equipped positive electrode for a non-aqueous secondary battery instead of a positive electrode for a non-aqueous secondary battery, and a porous membrane-equipped negative electrode for a non-aqueous secondary battery instead of a negative electrode for a non-aqueous secondary battery. A porous membrane-equipped, double-sided separator was separately produced for evaluation of blocking resistance. With the exception of these points, particulate polymers A and B, a slurry composition for a porous membrane, porous membrane-equipped (double-sided and single-sided) separators, a porous membrane-equipped positive electrode for a non-aqueous secondary battery, a porous membrane-equipped negative electrode for a non-aqueous secondary battery, and a non-aqueous secondary battery were produced in the same way as in Example 1. The same evaluations as in Example 1 were also carried out. (However, note that heat shrinkage resistance of a porous membrane after immersion in electrolyte solution was evaluated as heat shrinkage resistance of a porous membrane in a porous membrane-equipped negative electrode, and adhesiveness of a porous membrane after immersion in electrolyte solution was evaluated as adhesiveness of a porous membrane-equipped negative electrode and a separator.) The results are shown in Table 1.

Formation of Porous Membrane-Equipped Positive Electrode for Non-Aqueous Secondary Battery A slurry composition for a porous membrane obtained by the same method as in Example 1 was wire bar coated onto a positive electrode mixed material layer of a post-pressing positive electrode obtained by the same method as in Example 1 and was dried for 3 minutes at a temperature of 50° C. to obtain a porous layer-equipped positive electrode for a non-aqueous secondary battery that included a porous layer of 4 μm in thickness at one side (positive electrode mixed material layer-side).

Formation of Porous Membrane-Equipped Negative Electrode for Non-Aqueous Secondary Battery A slurry composition for a porous membrane obtained by the same method as in Example 1 was wire bar coated onto a negative electrode mixed material layer of a post-pressing negative electrode obtained by the same method as in Example 1 and was dried for 3 minutes at a temperature of 50° C. to obtain a porous layer-equipped negative electrode for a non-aqueous secondary battery that included a porous layer of 4μm in thickness at one side (negative electrode mixed material layer-side).

Production of Non-Aqueous Secondary Battery

The porous membrane-equipped positive electrode obtained as described above was cut out as 49 cm×5 cm and was placed with the surface at the porous membrane-side thereof as an upper side. A separator for a non-aqueous secondary battery that had been cut out as 120 cm×5.5 cm was placed on the porous membrane-equipped positive electrode such that the porous membrane-equipped positive electrode was positioned at a longitudinal direction left-hand side of the separator. In addition, the porous membrane-equipped negative electrode obtained as described above was cut out as 50 cm×5.2 cm and was placed on the separator such that the surface at the porous membrane-side thereof was positioned at a longitudinal direction right-hand side of the separator. The resultant product was then wound by a winding machine with the longitudinal direction middle of the separator at the center so as to obtain a roll (laminate). This roll was pressed into a flat form at 60° C. and 0.5 MPa and was then enclosed in an aluminum packing case serving as a battery case. Electrolyte solution (solvent: EC/DEC/VC (volume mixing ratio)=68.5/30/1.5; electrolyte: $LiPF_6$ of 1 M in concentration) was injected such that no air remained. In addition, the aluminum packing case was closed by heat sealing at 150° C. so as to tightly seal an opening of the aluminum packing case. Thereafter, the roll that had been sealed in the aluminum packing case was pressed, together with the aluminum packing case, for 4 minutes at a temperature of 80° C. and a pressure of 1 MPa, and thus a wound lithium ion secondary battery having a discharge capacity of 1,000 mAh was produced as a non-aqueous secondary battery.

Output characteristics of the obtained secondary battery were evaluated. The results are shown in Table 1.

Comparative Example 1

A particulate polymer A, a slurry composition for a porous membrane, porous membrane-equipped (double-sided and single-sided) separators, a positive electrode for a non-aqueous secondary battery, a negative electrode for a non-aqueous secondary battery, and a non-aqueous secondary battery were produced in the same way as in Example 1 with the exception that in production of the slurry composition for a porous membrane in Example 1, a particulate polymer B was not used. The same evaluations as in Example 1 were also carried out. The results are shown in Table 1.

Comparative Example 2

A particulate polymer A, a slurry composition for a porous membrane, porous membrane-equipped (double-sided and single-sided) separators, a positive electrode for a non-aqueous secondary battery, a negative electrode for a non-aqueous secondary battery, and a non-aqueous secondary battery were produced in the same way as in Example 1 with the exception that instead of using a particulate polymer B having a core-shell structure in Example 1, a particulate polymer B having a non-core-shell structure that was produced as described below was used. The same evaluations as in Example 1 were also carried out. The results are shown in Table 1.

Production of Particulate Polymer B Having Non-Core-Shell Structure

A reactor including a stirrer was supplied with 100 parts of deionized water and 0.5 parts of ammonium persulfate. The gas phase of the reactor was purged with nitrogen gas and the temperature was raised to 60° C. A monomer mixture was obtained in a separate vessel by mixing 50 parts of deionized water, 0.3 parts of sodium dodecylbenzenesulfonate as an emulsifier, 28 parts of butyl acrylate (BA) as a (meth)acrylic acid alkyl ester monomer, 20 parts of methyl methacrylate (MMA) as a (meth)acrylic acid alkyl ester monomer, 50 parts of acrylonitrile (AN) as a nitrile group-containing monomer, 1 part of methacrylic acid (MAA) as an acidic group-containing monomer, and 1 part of ethylene dimethacrylate (EDMA) as a crosslinkable group-containing monomer. The monomer mixture was continuously added to the reactor over 4 hours to carry out polymerization at 60° C. Polymerization was continued until the polymerization conversion rate reached 96% to yield a water dispersion containing a particulate polymer.

Comparative Example 3

Particulate polymers A and B, a slurry composition for a porous membrane, porous membrane-equipped (double-sided and single-sided) separators, a positive electrode for a non-aqueous secondary battery, a negative electrode for a non-aqueous secondary battery, and a non-aqueous secondary battery were produced in the same way as in Example 2 with the exception that in production of the particulate polymer A in Example 2, 92 parts of 2-ethylhexyl acrylate (2-EHA) and 3 parts of styrene (ST) were used instead of 68 parts of 2-ethylhexyl acrylate (2-EHA) and 27 parts of styrene (ST). The same evaluations as in Example 2 were also carried out. The results are shown in Table 1.

Comparative Example 4

Particulate polymers A and B, a slurry composition for a porous membrane, porous membrane-equipped (double-sided and single-sided) separators, a positive electrode for a non-aqueous secondary battery, a negative electrode for a non-aqueous secondary battery, and a non-aqueous secondary battery were produced in the same way as in Example 1 with the exception that in production of the particulate polymer A in Example 1, 45 parts of 2-ethylhexyl acrylate (2-EHA) and 50 parts of styrene (ST) were used instead of 68 parts of 2-ethylhexyl acrylate (2-EHA) and 27 parts of styrene (ST). The same evaluations as in Example 1 were also carried out. The results are shown in Table 1.

Example 14

Particulate polymers A and B, a slurry composition for a porous membrane, porous membrane-equipped (double-sided and single-sided) separators, a positive electrode for a non-aqueous secondary battery, a negative electrode for a non-aqueous secondary battery, and a non-aqueous secondary battery were produced in the same way as in Example 2 with the exception that in production of the particulate polymer B in Example 2, 0.7 parts of vinyl sulfonic acid (VSA) was used instead of 0.7 parts of methacrylic acid (MAA). The same evaluations as in Example 2 were also carried out. The results are shown in Table 1-2.

TABLE 1

| | | | | Example 1 | Example 2 | Example 3 | Example 4 | Example 5 | Example 6 | Example 7 | Example 8 | Example 9 |
|---|---|---|---|---|---|---|---|---|---|---|---|---|
| Binder composition for porous membrane | Particulate polymer A | (Meth)acrylic acid alkyl ester monomer unit | Type | 2EHA | 2EHA | 2EHA | 2EHA | Lauryl acrylate | 2EHA | 2EHA | 2EHA | 2EHA |
| | | | Content (mass %) | 68 | 68 | 80 | 55 | 68 | 68 | 68 | 68 | 68 |
| | | Aromatic monovinyl monomer unit | Type | ST | ST | ST | ST | ST | ST | ST | ST | ST |
| | | | Content (mass %) | 27 | 27 | 15 | 40 | 27 | 27 | 27 | 27 | 27 |
| | | Acidic group-containing monomer unit | Type | AA | AA | AA | AA | AA | AA | AA | AA | AA |
| | | | Content (mass %) | 3 | 3 | 3 | 3 | 3 | 3 | 3 | 3 | 3 |
| | | Crosslinkable monomer unit | Type | AGE | AGE | AGE | AGE | AGE | AGE | AGE | AGE | AGE |
| | | | Content (mass %) | 1.7 | 1.7 | 1.7 | 1.7 | 1.7 | 1.7 | 1.7 | 1.7 | 1.7 |
| | | | Type | AMA | AMA | AMA | AMA | AMA | AMA | AMA | AMA | AMA |
| | | | Content (mass %) | 0.3 | 0.3 | 0.3 | 0.3 | 0.3 | 0.3 | 0.3 | 0.3 | 0.3 |
| | | Particle diameter (nm) | | 200 | 200 | 200 | 200 | 200 | 200 | 200 | 240 | 200 |
| | | Tg (° C.) | | −20 | −20 | −35 | −10 | 10 | −20 | −20 | −20 | −20 |
| | Particulate polymer B | Structure | | Partially covered core-shell | Partially covered core-shell | Partially covered core-shell | Partially covered core-shell | Partially covered core-shell | Partially covered core-shell | Partially covered core-shell | Partially covered core-shell | Partially covered core-shell |
| | | Core portion | Nitrile group-containing monomer unit | Type | AN | AN | AN | AN | AN | AN | AN | AN | AN |
| | | | Content (mass %) | 30 | 45 | 30 | 30 | 30 | 30 | 30 | 30 | 46 |
| | | | (Meth)acrylic acid alkyl ester monomer unit | Type | BA | BA | BA | BA | BA | BA | BA | BA | BA |
| | | | Content (mass %) | 24.6 | 23.6 | 24.6 | 24.6 | 24.6 | 24.6 | 24.6 | 24.6 | 9.6 |
| | | | monomer unit | Type | MMA | MMA | MMA | MMA | MMA | MMA | MMA | MMA | MMA |
| | | | Content (mass %) | 14 | 0 | 14 | 14 | 14 | 14 | 14 | 14 | 13 |
| | | | Acidic group-containing monomer unit | Type | MAA | MAA | MAA | MAA | MAA | MAA | MAA | MAA | MAA |
| | | | Content (mass %) | 0.7 | 0.7 | 0.7 | 0.7 | 0.7 | 0.7 | 0.7 | 0.7 | 0.7 |
| | | | Crosslinkable monomer unit | Type | EDMA | EDMA | EDMA | EDMA | EDMA | EDMA | EDMA | EDMA | EDMA |
| | | | Content (mass %) | 0.7 | 0.7 | 0.7 | 0.7 | 0.7 | 0.7 | 0.7 | 0.7 | 0.7 |
| | | Shell portion | Aromatic monovinyl monomer unit | Type | ST | ST | ST | ST | ST | ST | ST | ST | ST |
| | | | Content (mass %) | 30 | 30 | 30 | 30 | 30 | 30 | 30 | 30 | 30 |
| | | Particle diameter (nm) | | 500 | 500 | 500 | 500 | 500 | 300 | 800 | 300 | 500 |

TABLE 1-continued

|  |  |  |  |  |  |  |  |  |  |  |
|---|---|---|---|---|---|---|---|---|---|---|
|  | Particle diameter ratio A/B | 0.4 | 0.4 | 0.4 | 0.4 | 0.4 | 0.66 | 0.25 | 0.8 | 0.4 |
|  | Particulate polymer A:Particulate polymer B (mass ratio) | 5:20 | 5:20 | 5:20 | 5:20 | 5:20 | 5:20 | 5:20 | 5:20 | 5:20 |
| Substrate | Type | Separator | Separator | Separator | Separator | Separator | Separator | Separator | Separator | Separator |
| Evaluations | Heat shrinkage resistance of porous membrane | A | A | A | B | B | B | A | B | B |
|  | Adhesiveness of porous membrane | A | A | A | B | B | B | A | B | B |
|  | Blocking resistance of porous membrane | A | A | B | A | A | A | A | A | A |
|  | Output characteristics of secondary battery | A | A | A | B | A | B | B | B | B |

|  |  |  |  |  | Example 10 | Example 11 | Example 12 | Example 13 | Comparative Example 1 | Comparative Example 2 | Comparative Example 3 | Comparative Example 4 |
|---|---|---|---|---|---|---|---|---|---|---|---|---|
| Binder composition for porous membrane | Particulate polymer A | (Meth)acrylic acid alkyl ester monomer unit | Type | | 2EHA | 2EHA | 2EHA | 2EHA | 2EHA | 2EHA | 2EHA | 2EHA |
|  |  |  | Content (mass %) | | 68 | 68 | 68 | 68 | 68 | 68 | 92 | 45 |
|  |  | Aromatic monovinyl monomer unit | Type | | ST | ST | ST | ST | ST | ST | ST | ST |
|  |  |  | Content (mass %) | | 27 | 27 | 27 | 27 | 27 | 27 | 3 | 50 |
|  |  | Acidic group-containing monomer unit | Type | | AA | AA | AA | AA | AA | AA | AA | AA |
|  |  |  | Content (mass %) | | 3 | 3 | 3 | 3 | 3 | 3 | 3 | 3 |
|  |  | Crosslinkable monomer unit | Type | | AGE | AGE | AGE | AGE | AGE | AGE | AGE | AGE |
|  |  |  | Content (mass %) | | 1.7 | 1.7 | 1.7 | 1.7 | 1.7 | 1.7 | 1.7 | 1.7 |
|  |  |  | Type | | AMA | AMA | AMA | AMA | AMA | AMA | AMA | AMA |
|  |  |  | Content (mass %) | | 0.3 | 0.3 | 0.3 | 0.3 | 0.3 | 0.3 | 0.3 | 0.3 |
|  |  | Particle diameter (nm) | | | 200 | 200 | 200 | 200 | 200 | 200 | 200 | 200 |
|  |  | Tg (° C.) | | | −20 | −20 | −20 | −20 | −20 | −20 | −55 | 0 |
|  | Particulate polymer B | Structure | | | Partially covered core-shell | Partially covered core-shell | Partially covered core-shell | Partially covered core-shell | None | Non-core-shell structure | Partially covered core-shell | Partially covered core-shell |
|  |  | Core portion | Nitrile group-containing monomer unit | Type | AN | AN | AN | AN |  | AN | AN | AN |
|  |  |  |  | Content (mass %) | 22 | 25.7 | 28.6 | 30 |  | 50 | 45 | 30 |
|  |  |  | (Meth)acrylic acid alkyl ester monomer unit | Type | BA | BA | BA | BA |  | BA | BA | BA |
|  |  |  |  | Content (mass %) | 32.6 | 26.6 | 26.6 | 24.6 |  | 28 | 23.6 | 24.6 |
|  |  |  |  | Type | MMA | MMA | MMA | MMA |  | MMA | MMA | MMA |
|  |  |  |  | Content (mass %) | 14 | 14 | 14 | 14 |  | 20 | 0 | 14 |
|  |  |  | Acidic group-containing monomer unit | Type | MAA | MAA | MAA | MAA |  | MAA | MAA | MAA |
|  |  |  |  | Content (mass %) | 0.7 | 3 | 0.1 | 0.7 |  | 1 | 0.7 | 0.7 |
|  |  |  | Crosslinkable monomer unit | Type | EDMA | EDMA | EDMA | EDMA |  | EDMA | EDMA | EDMA |
|  |  |  |  | Content (mass %) | 0.7 | 0.7 | 0.7 | 0.7 |  | 1 | 0.7 | 0.7 |
|  |  | Shell portion | Aromatic monovinyl monomer unit | Type | ST | ST | ST | ST |  | None | ST | ST |
|  |  |  |  | Content (mass %) | 30 | 30 | 30 | 30 |  |  | 30 | 30 |
|  |  | Particle diameter (nm) | | | 500 | 500 | 500 | 500 |  |  | 500 | 500 |
|  | Particle diameter ratio A/B | | | | 0.4 | 0.4 | 0.4 | 0.4 |  | 0.4 | 0.4 | 0.4 |
|  | Particulate polymer A:Particulate polymer B (mass ratio) | | | | 5:20 | 5:20 | 5:20 | 5:20 | 5:0 | 5:20 | 5:20 | 5:20 |
| Substrate | Type | | | | Separator | Separator | Separator | Electrode | Separator | Separator | Separator | Separator |
| Evaluations | Heat shrinkage resistance of porous membrane | | | | B | A | A | A | A | C | C | B |
|  | Adhesiveness of porous membrane | | | | B | A | A | A | C | B | C | C |
|  | Blocking resistance of porous membrane | | | | A | A | A | A | C | C | D | A |
|  | Output characteristics of secondary battery | | | | B | B | B | A | C | B | C | C |

TABLE 1-2

| | | | | | Example 14 |
|---|---|---|---|---|---|
| Binder composition for porous membrane | Particulate polymer A | (Meth)acrylic acid alkyl ester monomer unit | | Type | 2EHA |
| | | | | Content (mass %) | 68 |
| | | Aromatic monovinyl monomer unit | | Type | ST |
| | | | | Content (mass %) | 27 |
| | | Acidic group-containing monomer unit | | Type | AA |
| | | | | Content (mass %) | 3 |
| | | Crosslinkable monomer unit | | Type | AGE |
| | | | | Content (mass %) | 1.7 |
| | | | | Type | AMA |
| | | | | Content (mass %) | 0.3 |
| | | Particle diameter (nm) | | | 200 |
| | | Tg (° C.) | | | −20 |
| | Particulate polymer B | Structure | | | Partially covered core-shell |
| | | Core portion | Nitrile group-containing monomer unit | Type | AN |
| | | | | Content (mass %) | 45 |
| | | | (Meth)acrylic acid alkyl ester monomer unit | Type | BA |
| | | | | Content (mass %) | 23.6 |
| | | | | Type | MMA |
| | | | | Content (mass %) | 0 |
| | | | Acidic group-containing monomer unit | Type | VSA |
| | | | | Content (mass %) | 0.7 |
| | | | Crosslinkable monomer unit | Type | EDMA |
| | | | | Content (mass %) | 0.7 |
| | | Shell portion | Aromatic monovinyl monomer unit | Type | ST |
| | | | | Content (mass %) | 30 |
| | | Particle diameter (nm) | | | 500 |
| | Particle diameter ratio A/B | | | | 0.4 |
| | Particulate polymer A:Particulate polymer B (mass ratio) | | | | 520 |
| Substrate | Type | | | | Separator |
| Evaluations | Heat shrinkage resistance of porous membrane | | | | A |
| | Adhesiveness of porous membrane | | | | A |
| | Blocking resistance of porous membrane | | | | A |
| | Output characteristics of secondary battery | | | | A |

It can be seen from Tables 1 and 1-2 that adhesiveness of a porous membrane in electrolyte solution, heat shrinkage resistance of a porous membrane in electrolyte solution, and blocking resistance of a porous membrane were excellent in each of Examples 1 to 14 in which the used binder composition for a non-aqueous secondary battery porous membrane contained a particulate polymer A and a particulate polymer B having a larger volume-average particle diameter than the particulate polymer A, and in which the particulate polymer A included a (meth)acrylic acid alkyl ester monomer unit in a proportion of not less than 50 mass % and not more than 90 mass %, and the particulate polymer B had a core-shell structure and included a nitrile group-containing monomer unit in a core portion of the core-shell structure.

On the other hand, adhesiveness of a porous membrane in electrolyte solution was poor in Comparative Example 1 in which the used binder composition for a non-aqueous secondary battery porous membrane did not contain a particulate polymer B. Moreover, blocking resistance of a porous membrane was poor, and output characteristics of a secondary battery were poor.

It can also be seen that heat shrinkage resistance of a porous membrane in electrolyte solution was poor in Comparative Example 2 in which a particulate polymer B that did not have a core-shell structure was used. Blocking resistance of a porous membrane was also poor.

Moreover, it can be seen that adhesiveness of a porous membrane in electrolyte solution and heat shrinkage resistance of a porous membrane in electrolyte solution were poor in Comparative Example 3 in which the percentage content of a (meth)acrylic acid alkyl ester monomer unit in a particulate polymer A of the used binder composition for a non-aqueous secondary battery porous membrane exceeded 90 mass %. It can also be seen that blocking resistance of a porous membrane was poor, and output characteristics of a secondary battery were poor.

Furthermore, it can be seen that adhesiveness of a porous membrane in electrolyte solution was poor in Comparative Example 4 in which the percentage content of a (meth)acrylic acid alkyl ester monomer unit in a particulate polymer A was less than 50 mass %. It can also be seen that output characteristics of a secondary battery were poor.

INDUSTRIAL APPLICABILITY

According to the present disclosure, it is possible to provide a binder composition for a non-aqueous secondary battery porous membrane capable of forming a porous membrane having improved adhesiveness in electrolyte solution, heat shrinkage resistance in electrolyte solution, and blocking resistance.

Moreover, according to the present disclosure, it is possible to provide a slurry composition for a non-aqueous secondary battery porous membrane capable of forming a porous membrane having improved adhesiveness in electrolyte solution, heat shrinkage resistance in electrolyte solution, and blocking resistance.

Furthermore, according to the present disclosure, it is possible to provide a porous membrane for a non-aqueous secondary battery having improved adhesiveness in electrolyte solution, heat shrinkage resistance in electrolyte solution, and blocking resistance, and a non-aqueous secondary battery including this porous membrane for a non-aqueous secondary battery.

The invention claimed is:

1. A binder composition for a non-aqueous secondary battery porous membrane comprising:
    a particulate polymer A; and
    a particulate polymer B having a larger volume-average particle diameter than the particulate polymer A, wherein
    the particulate polymer A includes a (meth)acrylic acid alkyl ester monomer unit,
    a percentage content of the (meth)acrylic acid alkyl ester monomer unit when the amount of all monomer units included in the particulate polymer A is taken to be 100 mass % is 50 mass % or more and 90 mass % or less,
    the particulate polymer B has a core-shell structure and includes a nitrile group-containing monomer unit in a core portion of the core-shell structure,
    the particulate polymer A has a volume-average particle diameter of not less than 50 nm and not more than 250 nm,
    the particulate polymer B further includes an acidic group-containing monomer unit in the core portion, and
    a percentage content of the acidic group-containing monomer unit present in the core portion of the particulate polymer B when the amount of all monomer units included in the particulate polymer B is taken to be 100 mass % is 0.5 mass % or more and 3.0 mass % or less.

2. The binder composition for a non-aqueous secondary battery porous membrane according to claim 1, wherein a percentage content of the nitrile group-containing monomer unit present in the core portion of the particulate polymer B when the amount of all monomer units included in the particulate polymer B is taken to be 100 mass % is 20 mass % or more and 80 mass % or less.

3. The binder composition for a non-aqueous secondary battery porous membrane according to claim 1, wherein the particulate polymer B has a volume-average particle diameter of not less than 300 nm and not more than 1,000 nm.

4. A slurry composition for a non-aqueous secondary battery porous membrane comprising:
    the binder composition for a non-aqueous secondary battery porous membrane according to claim 1; and
    non-conductive particles.

5. A porous membrane for a non-aqueous secondary battery formed from the slurry composition for a non-aqueous secondary battery porous membrane according to claim 4.

6. A non-aqueous secondary battery comprising a positive electrode, a negative electrode, a separator, and an electrolyte solution, wherein
    at least one battery component selected from the group consisting of the positive electrode, the negative electrode, and the separator includes the porous membrane for a non-aqueous secondary battery according to claim 5.

7. A non-aqueous secondary battery production method for producing a non-aqueous secondary battery according to claim 6, comprising
    adhering a separator according to claim 6 and at least one of a positive electrode according to claim 6 and a negative electrode according to claim a porous membrane according to claim 6 for the non-aqueous secondary battery according to claim 6.

8. The non-aqueous secondary battery production method according to claim 7, wherein the adhering includes either or both of pressing and heating a laminate in which the separator and at least one of the positive electrode and the negative electrode are stacked via the porous membrane for a non-aqueous secondary battery.

* * * * *